United States Patent
Charters et al.

(10) Patent No.: US 7,352,940 B2
(45) Date of Patent: Apr. 1, 2008

(54) WAVEGUIDE DESIGN INCORPORATING REFLECTIVE OPTICS

(75) Inventors: Robbie Charters, Palmerston (AU);
Benjamin Cornish, Palmerston (AU);
Barry Luther-Davies, Kambah (AU);
Dax Kukulj, Acton (AU); Graham Atkins, Kaleen (AU)

(73) Assignee: RPO Pty Limited, Acton, ACT (AU)

( * ) Notice: Subject to any disclaimer, the term of this patent is extended or adjusted under 35 U.S.C. 154(b) by 17 days.

(21) Appl. No.: 11/350,387

(22) Filed: Feb. 7, 2006

(65) Prior Publication Data
US 2006/0188196 A1  Aug. 24, 2006

(51) Int. Cl.
*G02B 6/10* (2006.01)
*G06F 3/042* (2006.01)

(52) U.S. Cl. .................. 385/129; 385/14; 385/31; 385/33; 385/130; 385/132; 345/176

(58) Field of Classification Search .............. 385/1, 385/2, 3, 14, 15, 16, 17, 18, 24, 31, 37, 115, 385/116, 146, 900, 901, 32, 33, 34, 129, 130, 385/131, 132; 345/176
See application file for complete search history.

(56) References Cited

U.S. PATENT DOCUMENTS

| | | | | |
|---|---|---|---|---|
| 5,914,709 A * | 6/1999 | Graham et al. | ............. | 345/179 |
| 6,181,842 B1 * | 1/2001 | Francis et al. | ................ | 385/14 |
| 2004/0201579 A1 * | 10/2004 | Graham | ...................... | 345/175 |
| 2005/0271326 A1 * | 12/2005 | Luo | ............................ | 385/43 |
| 2006/0001653 A1 * | 1/2006 | Smits | .......................... | 345/176 |
| 2006/0188196 A1 * | 8/2006 | Charters et al. | ............. | 385/33 |

* cited by examiner

*Primary Examiner*—Brian M. Healy
(74) *Attorney, Agent, or Firm*—Miller, Matthias & Hull

(57) ABSTRACT

This invention relates to devices for coupling light between an optical waveguide and an optical element in a manner that is substantially independent of temperature, using reflective optics. Certain embodiments of the invention concern improved designs for the transmit and receive optics of a waveguide-based optical touch screen sensor, incorporating reflective optics. The improved designs have substantially temperature independent operation and reduced optical losses. In one preferred embodiment the improved design incorporates a parabolic or quasi-parabolic reflector. In another preferred embodiment the improved design incorporates an elliptical or quasi-elliptical reflector. The transmit and receive elements and associated waveguides preferably comprise photo-patternable polymers.

82 Claims, 14 Drawing Sheets

US 7,352,940 B2

WAVEGUIDE DESIGN INCORPORATING REFLECTIVE OPTICS

FIELD OF INVENTION

This invention relates to an improved design for the transmit and receive optics of a waveguide-based optical touch screen sensor. The improved design incorporates reflective optics, and has the advantages of reduced temperature sensitivity and reduced optical losses. However, it will be appreciated that the invention is not limited to this particular field of use, and may be applied to the coupling of light between any two optical elements, at least one of which is a waveguide.

BACKGROUND OF INVENTION

Any discussion of the prior art throughout the specification should in no way be considered as an admission that such prior art is widely known or forms part of common general knowledge in the field.

FIG. 1 illustrates the operation of an optical touch screen sensor 1 described in U.S. Pat. Nos. 5,914,709, 6,181,842 and 6,351,260, and US Patent Application Nos. 2002/0088930 A1 and 2004/0201579 A1 (the contents of which are incorporated into this specification by way of cross-reference). In this optical touch screen sensor design, integrated optical waveguides 2, 3 are used to launch an array of light beams 4 across a screen, then collect them at the other side of the screen and conduct them to a position-sensitive detector. A touch event 5 (eg. by a finger or stylus) is detected as a shadow 6, with position determined from the particular beam(s) blocked by the touching object. The touch screen sensors are usually two dimensional and rectangular, with two arrays (X, Y) of transmit waveguides along adjacent sides of the screen, and two corresponding arrays of receive waveguides along the other two sides of the screen. As part of the transmit side, in one embodiment a single optical source (such as a light emitting diode (LED) or a vertical cavity surface emitting laser (VCSEL)) launches light into a plurality of waveguides that form both the X and Y transmit arrays. In another embodiment, a separate optical source is used for each of the X and Y transmit arrays. In an existing design for the transmit side, the waveguide arrays guide light from the source to rows of lenses 7 that expand the guided light beams in the horizontal (ie. x,y) plane, then collimate them in the horizontal plane as they are launched across the screen face. Collimation in the vertical plane may be achieved with an external vertical collimating lens (VCL), for example a cylindrical lens, not shown in FIG. 1. The receive side is essentially identical, and on each side the arrays of waveguides and lenses are positioned within the bezel of the screen.

US Patent Application No. 2004/0201579 A1 teaches that the light beams launched across the screen preferably form a "lamina" (ie. a thin sheet) of light, and more preferably a lamina of substantially uniform intensity. Compared to the alternative of having discrete beams separated by considerable dark regions, a lamina of light minimises the required dynamic range of the photodetectors associated with the X, Y receive arrays, enhances the grey scale interpolation of the position sensing algorithms, and minimises the chance that a thin touching object could be missed by the beams. The discrete beam case also complicates the manufacturing process, because the receive side waveguides need to be critically aligned (in the horizontal plane) with the transmit side waveguides; with a lamina of light, the horizontal positioning of the receive side waveguides is non-critical. Accordingly, although an optical touch screen sensor of this type can operate with discrete beams, it is preferable for the beams to approximate a lamina as closely as possible.

FIG. 2 illustrates the operation of an optical transmission device 20 of a type described in US Patent Application No. 2002/0197010 A1, the contents of which are incorporated into this specification by way of cross-reference. The device 20 shown in FIG. 2 serves to couple light between two integrated optical waveguides 21 and 22, formed on separate substrates (not shown). It will be appreciated by those skilled in the art that since optical waveguides are typically small structures (of order 10 μm×10 μm), it is difficult to couple light between them efficiently without resorting to expensive active alignment schemes. It is therefore preferable to use some sort of beam expanding device such as that illustrated in FIG. 2 to reduce the alignment tolerances. In the particular device shown in FIG. 2, light 23 propagating along waveguide 21 is expanded and collimated in the horizontal (page) plane by planar lens 24, formed integrally with waveguide 21, then collimated in the vertical plane by external cylindrical lens 25 to produce expanded beam 26. A similar pairing of cylindrical lens 27 and planar lens 28 focuses the light into waveguide 22.

As disclosed in US 2002/0197010 A1, the basic design shown in FIG. 2 can be expanded to provide a multi-channel transmission device with a plurality of input waveguides 21 and planar lenses 24 formed on a common substrate and a like plurality of output waveguides 22 and planar lenses 28 formed on a second common substrate, with a single cylindrical lens 25 common to all input waveguides 21 and a single cylindrical lens 27 common to all output waveguides 22. It will be appreciated that in such a situation, the optics of the devices shown in FIGS. 1 and 2 have many similarities. In related transmission devices, waveguide 22 with its planar lens 28 and external lens 27 may be replaced by another optical element, such as an optical source or a detector.

For reasons of cost and ease of fabrication, it is highly preferred in many optical waveguide applications to form the waveguides and/or associated lenses out of a photo-patternable polymer material. Polymers are known to have large thermo-optic coefficients, ie. the rate of change of refractive index with temperature (dn/dT), of order −1 to −4×10$^{-4}$/° C. These large dn/dT values can be used to advantage in thermo-optic devices such as switches, tuneable gratings and variable optical attenuators (see for example U.S. Pat. No. 6,434,318, and "Advances in polymer integrated optics", L. Eldada and L. W. Shacklette, *IEEE Journal of Selected Topics in Quantum Electronics* vol. 6, No. 1, pp. 54-68 (2000)). However in certain applications such as the optical touch screen sensor of FIG. 1 and the transmission device of FIG. 2, a large dn/dT is disadvantageous because modest variations in ambient temperature, say over an operating range of −10 to 50° C., adversely affect the horizontal collimation at the planar lenses in FIGS. 1 and 2, by changing the angle of refraction at the polymer/air interfaces. This is because refraction is governed by Snell's Law ($n_i \sin \theta_i = n_r \sin \theta_r$), and a temperature-induced variation in one or both of the refractive indices $n_i$ and $n_r$ will change the angle of refraction $\theta_r$, unless the angle of incidence $\theta_i$ is zero (ie. normal incidence). In the operation of an optical touch screen as shown in FIG. 1, this dependence of refraction on temperature means that optics made of a polymer material and designed to launch collimated beams across the screen and receive them at the other side will only do so over a certain temperature range. If the temperature drifts too far, variations in the emission angles at the transmit side and/or in the acceptance angles at the receive side will reduce the collection efficiency, representing a source of optical loss in the system. Furthermore, stray light may be collected by adjacent receive lenses, possibly causing errors in determining the position of a touch event. Similarly, if waveguides 21 and 22 and planar lenses 24 and 28 in the transmission device shown in FIG. 2 were composed of polymer, temperature variations will affect the coupling efficiency between waveguides 21 and 22. The inventors of US 2002/0197010 A1 consider the effects of temperature variations on the external cylindrical lenses 25 and 27, but they do not consider the effects on planar lenses 24 and 28, even though they are preferably composed of polymer materials.

There exists then a need for a solution to this temperature sensitivity problem. One possible solution is to use a waveguide material with a much smaller thermo-optic coefficient, for example silica ($dn/dT \sim +1 \times 10^{-5}/^\circ$ C.). However silica glass waveguides are much more expensive to fabricate, both in terms of fabrication equipment and processing time, and are simply not an option for a mass-produced consumer electronics device such as an optical touch screen sensor. Another possible solution is to use a polymer with a thermo-optic coefficient at the low end of the polymer range, say around $-1 \times 10^{-4}/^\circ$ C. However this is still an order of magnitude greater than the thermo-optic coefficient of silica, so the temperature sensitivity will still be significant. Also, if a polymer has a low dn/dT, it is invariably below its glass transition temperature (Tg), ie. it is in its glassy state, and as expounded in U.S. Pat. No. 6,236,774, for long term stability of polymer waveguides it is preferable to operate above Tg, in which case the dn/dT will be at the high end of the polymer range.

The transmit and receive lenses of the existing optical touch screen design also encounter difficulties with collimation in the vertical plane, where for ease of assembly it is convenient to use a single VCL for all transmit or receive lenses in each array along the respective sides of the optical touch screen. The positioning of the VCL with respect to the curved end face 31 of a prior art transmit lens 30 is shown in FIGS. 3a (plan view) and 3b (side view). It can be seen that it is impossible for the entire curved end face 31 to be positioned at the focal plane 32 of VCL 33. Therefore while emerging rays 34 can be perfectly collimated in the vertical direction, this is not the case for rays 35 and 36. The unavoidable spread of the beam in the vertical direction is another cause of optical power loss in the prior art design. It will be appreciated that the same problem applies to the prior art transmission device shown in FIG. 2.

Another difficulty arises when the substrate is introduced into the picture. For a prior art transmit lens 30, FIGS. 4a (plan view) and 4b (side view) show guiding layer 40 on a substrate 41, with an (optional) optical buffer layer 42 between the two, in proximity to VCL 33. It will be appreciated that although substrate 41 can be cut (eg. with a dicing saw or by laser cutting) close to curved end face 31, the end face is an optical surface that must retain its integrity. FIG. 4b shows that because of the curvature of the end face, it is difficult to avoid having some of the emerging rays 43 being blocked ("shadowed") by substrate 41 and buffer layer 42, especially close to the edges of the lens. This represents yet another source of optical loss in the prior art system, and while in theory it is possible to avoid the shadowing effect by cutting the substrate in a shaped fashion, this would require extremely precise laser cutting and is simply impractical for the manufacture of low cost devices.

Yet another problem with the transmit and receive lenses of the existing design is that the curved end face must have an air/lens material interface. Therefore when an upper cladding (highly desirable for mechanical protection of the waveguides) is being deposited, it has to be patterned so that it does not cover the curved end face, as discussed in US Patent Application No. 2005/0089298 A1. However there is then a risk that the curved end face could be damaged, for example during assembly of the optical touch screen sensor.

It is an object of the present invention to overcome or ameliorate at least one of the disadvantages of the prior art, or to provide a useful alternative.

SUMMARY OF THE INVENTION

To this end, a first aspect of the invention provides an input device for an electronic device comprising:

at least one light source;

at least one multi-element light detector to detect light intensity at a plurality of light detecting elements;

an input area defining a plane; and a waveguide structure including a first set of waveguides with associated first set of reflective elements, and a second set of waveguides, each composed of a material with first refractive index, wherein:

said light source couples light into said first set of waveguides with associated first set of reflective elements;

said first set of waveguides directs the light onto said associated first set of reflective elements;

said associated first set of reflective elements collimates the light in the plane of the input area to produce a first grid of light beams; and said first grid of light beams traverses the input area in a first direction and is directed to the light detecting elements of said multi-element light detector by said second set of waveguides.

In one embodiment, the first set of waveguides with associated first set of reflective elements sends beams of light across the input area towards corresponding waveguides of the second set of waveguides. Preferably, the second set of waveguides includes an associated second set of reflective elements to focus the beams of light in the plane of the input area.

Preferably, each element of the associated first set of reflective elements comprises a planar slab region having a curved reflective surface and an output face, wherein:

light enters said planar slab region from the associated waveguide, reflects off said curved reflective surface, thereby being collimated and re-directed, and exits said output face in said first direction.

Preferably, light reflects off said curved reflective surface via total internal reflection.

In one embodiment, said curved reflective surface is concave.

In one embodiment, said curved reflective surface is parabolic. Preferably, said curved reflective surface is an off-axis parabolic mirror element.

In another embodiment, said curved reflective surface is elliptical.

More preferably, each element of the associated second set of reflective elements comprises a planar slab region having an input face and a curved reflective surface, wherein:

light enters said planar slab region through said input face in said first direction, encounters said curved reflective surface, and is thereby re-directed and focused into the associated waveguide.

Preferably, light reflects off said curved reflective surface via total internal reflection.

Preferably, said curved reflective surface is concave.

In one embodiment, said curved reflective surface is parabolic. Preferably, said curved reflective surface is an off-axis parabolic mirror element.

In another embodiment, said curved reflective surface is elliptical.

A second aspect of the present invention provides an input device for an electronic device comprising:

at least one light source;

at least one multi-element light detector to detect light intensity at a plurality of light detecting elements;

an input area defining a plane; and a waveguide structure including a first set of waveguides with associated first set of reflective elements, a third set of waveguides with associated third set of reflective elements, a second set of waveguides, and a fourth set of waveguides, each composed of a material with first refractive index, wherein:

said light source couples light into said first and third sets of waveguides with associated first and third sets of reflective elements;

said first and third sets of waveguides directs the light onto said associated first and third sets of reflective elements;

said associated first and third sets of reflective elements collimate the light in the plane of the input area to produce first and second grids of light beams;

said first grid of light beams traverses the input area in a first direction and is directed to a first set of light detecting elements of said multi-element light detector by said second set of waveguides; and said second grid of light beams traverses the input area in a second direction, different to said first direction, and is directed to a second set of light detecting elements of said multi-element light detector by said fourth set of waveguides.

Preferably, the first and third sets of waveguides with associated first and third sets of reflective elements send beams of light across the input area towards corresponding waveguides of the second and fourth sets of waveguides.

Preferably, the second and fourth sets of waveguides include associated second and fourth sets of reflective elements to focus the beams of light in the plane of the input area.

Preferably, each element of the associated first set of reflective elements comprises a planar slab region having a curved reflective surface and an output face, wherein:

light enters said planar slab region from the associated waveguide, reflects off said curved reflective surface, thereby being collimated and re-directed, and exits said output face in said first direction, and each element of the associated third set of reflective elements comprises a planar slab region having a curved reflective surface and an output face, wherein:

light enters said planar slab region from the associated waveguide, reflects off said curved reflective surface, thereby being collimated and re-directed, and exits said output face in said second direction.

Preferably, light reflects off said curved reflective surfaces via total internal reflection.

Preferably, said curved reflective surfaces are concave. In one embodiment, said curved reflective surfaces are parabolic.

Preferably, said curved reflective surfaces are off-axis parabolic mirror elements.

In another embodiment, said curved reflective surfaces are elliptical.

Preferably, each element of the associated second set of reflective elements comprises a planar slab region having an input face and a curved reflective surface, wherein:

light enters said planar slab region through said input face in said first direction, encounters said curved reflective surface, and is thereby re-directed and focused into the associated waveguide, and each element of the associated fourth set of reflective elements comprises a planar slab region having an input face and a curved reflective surface, wherein:

light enters said planar slab region through said input face in said second direction, encounters said curved reflective surface, and is thereby re-directed and focused into the associated waveguide.

Preferably, light reflects off said curved reflective surfaces via total internal reflection.

Preferably, said curved reflective surfaces are concave.

In one embodiment, said curved reflective surfaces are parabolic. Preferably, said curved reflective surfaces are off-axis parabolic mirror elements.

In another embodiment, said curved reflective surfaces are elliptical.

Preferably, said input area is quadrilateral, said first and third sets of waveguides with associated first and third sets of reflective elements are arranged along adjacent first and third edges of the input area, and said second and fourth sets of waveguides with associated second and fourth sets of associated reflective elements are arranged along adjacent second and fourth edges of the input area.

Preferably, said input area is rectangular, and the second direction is substantially perpendicular to the first direction.

Preferably, the first, second, third and fourth sets of waveguides with associated first, second, third and fourth sets of reflective elements terminate in end faces that are straight and parallel to the corresponding edges of the input area.

Preferably, the first direction is substantially perpendicular to the first and second edges of the input area, and the second direction is substantially perpendicular to the third and fourth edges of the input area.

In one embodiment, a user provides input to the electronic device by interacting with the input area. Preferably, the user interacts with the input area with a finger or stylus.

In one embodiment, said waveguide structure is a photolithographically defined structure. Alternatively, said waveguide structure is a moulded structure.

In one embodiment, said material with first refractive index is a dielectric material. Preferably, the dielectric material is a polymer.

In one embodiment, said associated first set of reflective elements collimates the light in a manner that is substantially independent of temperature.

Preferably, said associated second set of reflective elements focuses the beams of light in a manner that is substantially independent of temperature.

Preferably, said associated third set of reflective elements collimates the light in a manner that is substantially independent of temperature.

Preferably, said associated fourth set of reflective elements focuses the beams of light in a manner that is substantially independent of temperature.

In one embodiment the invention additionally comprises first and second external lenses proximate to the ends of the first and second sets of waveguides, to collimate the first grid of light beams in the direction perpendicular to the input area plane.

In one embodiment the invention additionally comprises third and fourth external lenses proximate to the ends of the third and fourth sets of waveguides, to collimate the second grid of light beams in the direction perpendicular to the input area plane.

In one embodiment the invention additionally comprises:

first and second external lenses proximate to the ends of the first and second sets of waveguides, to collimate the first grid of light beams in the direction perpendicular to the input area plane; and third and fourth external lenses proximate to the ends of the third and fourth sets of waveguides, to collimate the second grid of light beams in the direction perpendicular to the input area plane, wherein the ends of the first, second, third and fourth sets of waveguides are straight and located in the focal planes of the first, second, third and fourth external lenses.

In one embodiment the invention additionally comprises a transparent material with second refractive index between the ends of the first, second, third and fourth sets of waveguides and the first, second, third and fourth external lenses. Preferably, said second refractive index is substantially equal to the first refractive index.

Preferably, said transparent material with second refractive index is an adhesive, to attach each external lens to its respective set of waveguides. Preferably, said second refractive index is substantially equal to the first refractive index.

A third aspect of the present invention provides an optical transmission device comprising a first optical waveguide with an integrally formed reflective end structure and formed on a substrate, wherein said reflective end structure comprises a curved internally reflective surface, to couple light between the first optical waveguide and an optical element.

Preferably, said curved internally reflective surface focuses light in the plane of the substrate.

In one embodiment, said curved internally reflective surface is parabolic. Preferably, said curved internally reflective surface is an off-axis parabolic mirror element.

In another embodiment, said curved internally reflective surface is elliptical.

Preferably, said first optical waveguide and integrally formed reflective end structure comprise a dielectric material. More preferably, the dielectric material is a polymer.

Preferably, said first optical waveguide and integrally formed reflective end structure are formed by photolithography. Alternatively, they may be formed by a moulding technique.

Preferably, said reflective end structure couples light between said first optical waveguide and said optical element in a manner that is substantially independent of temperature.

In one embodiment, the optical element comprises an optical source, and said reflective end structure couples light from said optical source into said first optical waveguide. Preferably, the invention additionally comprises an external lens between said first optical waveguide and said optical source, to focus the light in the direction perpendicular to the substrate.

In another embodiment, the optical element comprises a detector, and said reflective end structure couples light from said first optical waveguide into said detector. Preferably, the invention additionally comprises an external lens between said first optical waveguide and said detector, to focus the light in the direction perpendicular to the substrate.

In yet another embodiment, said optical element comprises a second optical waveguide with an integrally formed reflective end structure and formed on a second substrate, wherein said reflective end structure comprises a curved internally reflective surface. Preferably, the invention additionally comprises a first external lens proximate to an end of said first optical waveguide, and a second external lens proximate to an end of said second optical waveguide, wherein the first and second external lenses focus light in the direction perpendicular to the substrate.

Preferably, the invention also comprises an input area between said first optical waveguide and said second optical waveguide.

A fourth aspect of the present invention provides an input device for an electronic device, comprising at least one optical transmission device, comprising: a first optical waveguide with an integrally formed reflective end structure and formed on a substrate, wherein said reflective end structure comprises a curved internally reflective surface; a second optical waveguide with an integrally formed reflective end structure and formed on a substrate, wherein said reflective end structure comprises a curved internally reflective surface; and an input area positioned between said first optical waveguide and said second optical waveguide.

In one embodiment, a user provides input to the electronic device by interacting with the input area. Preferably, the user interacts with the input area with a finger or stylus.

BRIEF DESCRIPTION OF THE DRAWINGS

The invention will now be described, by way of example only, with reference to the accompanying drawings in which.

DETAILED DESCRIPTION OF THE INVENTION

Figure 1:
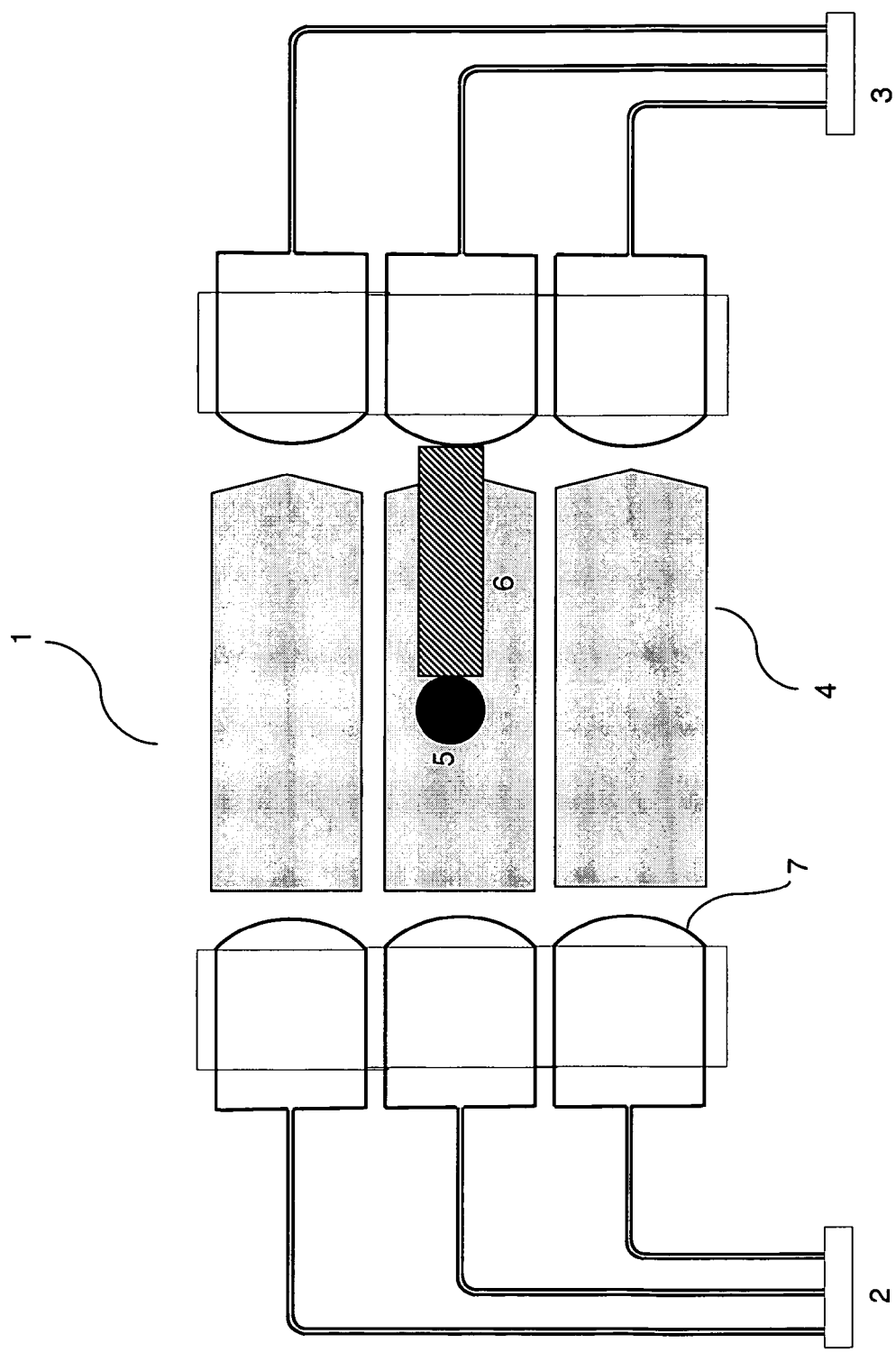
FIG. 1 illustrates the operation of a prior art waveguide-based optical touch screen sensor incorporating lenses to provide in-plane focusing of the light beams.

The waveguide-based optical touch screen sensor technology disclosed in U.S. Pat. Nos. 5,914,709, 6,181,842 and 6,351,260, and US Patent Application Nos. 2002/0088930 A1 and 2004/0201579 A1, illustrated schematically in FIG. 1, has potential application to a variety of consumer electronics devices, including mobile phones, computers, games, and personal digital assistants (PDAs). To be acceptable for such devices, it is essential that the various components be fabricated and assembled at an acceptable cost. Compared to an approach with paired arrays of optical sources and detectors, as disclosed for example in U.S. Pat. No. 4,301,447, this waveguide-based technology requires only one optical source and one detector, providing a significant cost advantage. With the waveguides and associated collimating optics being the enabling components of this touch screen sensor technology, it is necessary to be able to mass produce them in a low cost manner, a requirement that can only be satisfied with polymer materials.

Photo-curable polymers that can be processed using a photolithography/wet development method are particularly preferred because of the ease and mild conditions (eg. UV exposure followed by solvent development) by which they can be patterned, and the relatively low cost of the processing equipment. Other low cost methods for fabricating polymer waveguides are based on moulding and/or embossing (see for example U.S. Pat. Nos. 5,230,990 and 5,265,184), where waveguides can be produced repeatedly once a master or mould has been obtained. Photo-curable polymers are particularly suitable for such methods, because they can be cured (i.e. solidified) as required during the moulding process.

Examples of photo-curable polymers include acrylates and siloxanes. One particularly suitable class of materials is UV curable siloxane polymers, synthesised for example by a condensation reaction as disclosed in U.S. Pat. Nos. 6,800,724 and 6,818,721. Siloxane polymers have excellent adhesion to a variety of substrate materials, including silicon, glass and plastics. A photoinitiator or thermal initiator may be added to increase the rate of curing. Examples of commercially available photoinitiators include 1-hydroxy-cyclohexyl-phenyl-ketone (Irgacure 184), 2-methyl-1[4-methylthio)phenyl]-2-morpholinopropan-1-one (Irgacure 907), 2,2-dimethoxy-1,2-diphenylethan-1-one (Irgacure 651), 2-benzyl-2-dimethylamino-1-(4-morpholinophenyl)-butanone-1 (Irgacure 369), 4-(dimethylamino)benzophenone, 2-hydroxy-2-methyl-1-phenyl-propan-1-one (Darocur 1173), benzophenone (Darocur BP), 1-[4-(2-hydroxy-ethoxy)-phenyl]-2-hydroxy-2-methyl-1-propane-1-one (Irgacure 2959), 4,4'-bis(diethylamino)benzophenone (DEAB), 2-chlorothioxanthone, 2-methylthioxanthone, 2-isopropylthioxanthone, benzoin and 4,4'-dimethoxybenzoin. For curing with visible light, the initiator may for example be camphorquinone. A mixture of two or more photoinitiators may also be used. For example, Irgacure 1000 is a mixture of 80% Darocur 1173 and 20% Irgacure 184. For thermal curing, organic peroxides in the form of peroxides (eg. dibenzoyl peroxide), peroxydicarbonates, peresters (t-butyl perbenzoate), perketals, hydroperoxides, as well as AIBN (azobisisobutyronitrile), may be used as initiators.

Other additives, such as stabilisers, plasticisers, contrast enhancers, dyes or fillers may be added to enhance the properties of the polymer as required.

Thin films of polymer material suitable for waveguide fabrication by photo-patterning or moulding can be deposited on a substrate by a variety of methods, including spin coating, dip coating, meniscus coating, extrusion coating and slot coating. For photo-patterning, these thin films can then be exposed to light either through a mask, eg. in a mask aligner or stepper, or by a laser direct writing procedure; exposure through a mask is generally preferred for high fabrication throughput.

Hereinafter it will be assumed that the operating wavelength of the optical touch screen sensor is 850 nm, and that the waveguides and associated collimating/focusing optics are composed of a siloxane polymer A with refractive index n (at 850 nm) of 1.5315 at 25° C., and with a thermo-optic coefficient $dn/dT = -2.8 \times 10^{-4}/°$ C. It will be appreciated by those skilled in the art that if another type of polymer with different refractive index and dn/dT values were used instead, the prior art refractive transmit and receive optics could be re-designed to suit the new refractive index, but the temperature sensitivity would remain.

EXAMPLE 1

Figure 5:
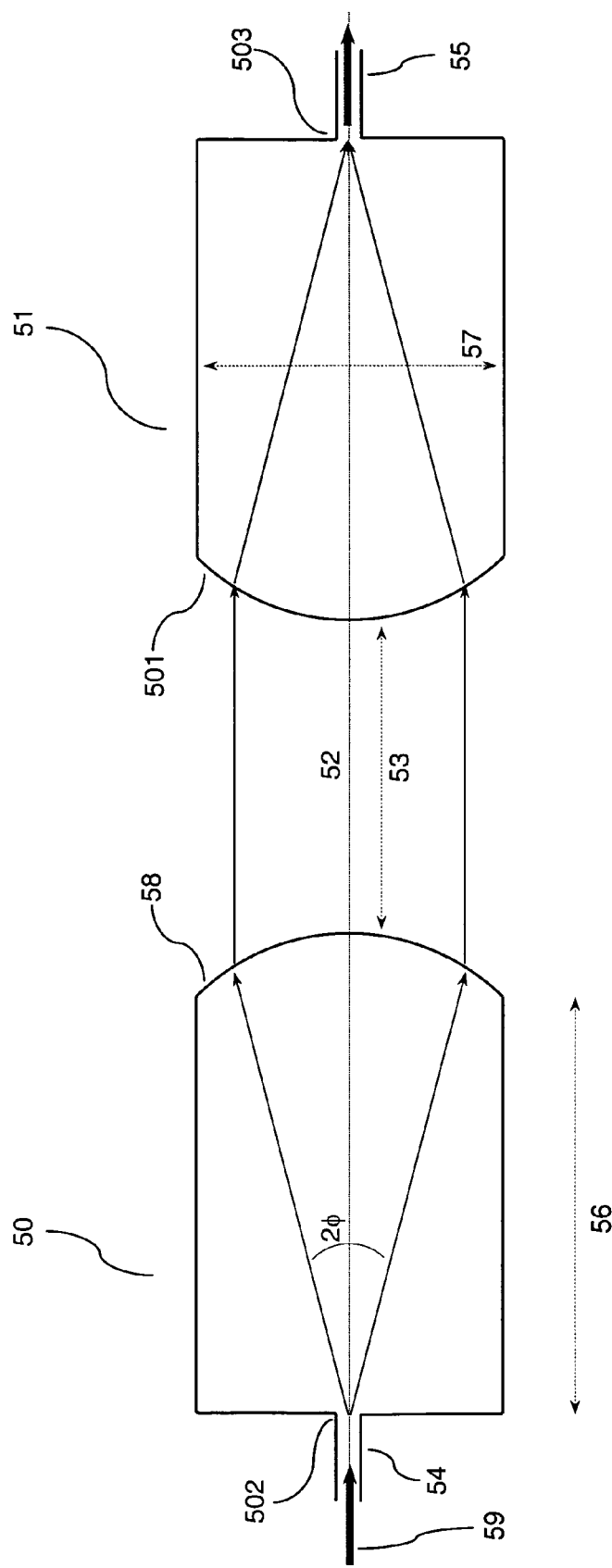
FIG. 5 is a plan view of a prior art pair of spherical transmit and receive lenses of a waveguide-based optical touch screen sensor.

This example is designed to illustrate the temperature sensitivity of a paired set of prior art transmit and receive lenses that form part of an optical touch screen sensor. FIG. 5 shows transmit lens 50 and receive lens 51, each composed of polymer A and being mirror images of each other. In this example the lenses are assumed to be perfectly aligned in the horizontal plane, ie. that they share an optical axis 52. The width of the touch screen, ie. the tip-to-tip separation 53 of the lenses, is 65 mm, and the cylindrical lenses that collimate the beams in the vertical (out of page) dimension have been omitted for clarity. Waveguides 54 and 55 entering the ends of lenses 50 and 51 at points 502 and 503 are both 8 μm wide and aligned with the axis of symmetry of the respective lens. Each lens 50, 51 has a straight section 56 of length 1460 μm and width 57 of 750 μm, and ends in a curved surface 58, 501 that is an arc of a circle with radius of curvature 570 μm. Ideally, light 59 from the optical source enters the end of transmit lens 50, diverges within an angle 2φ, and is collimated (in the horizontal plane) at curved surface 58 into a beam that traverses the screen to curved surface 501, where it is focused into receive waveguide 55 and guided to a detector element. As mentioned previously, it is preferable that the light beams launched across the screen form a lamina of light rather than discrete beams. With regard to FIG. 5, this means that the divergence angle φ should be as close as possible to a value (14.4° in this example) such that the curved surface 58 is filled with light. In practice, the divergence angle is determined largely by the width of waveguide 54 and the number of optical modes guided therein, and to a much smaller extent by the refractive index of the polymer material.

For simplicity, a geometrical ray optics approach has been used to model the propagation of light in this example and all subsequent examples. Diffraction of the light traversing the touch screen is neglected, and point sources (eg. at point 502 in FIG. 5) are assumed. It is also assumed that the light is perfectly collimated in the vertical plane.

Figure 6:
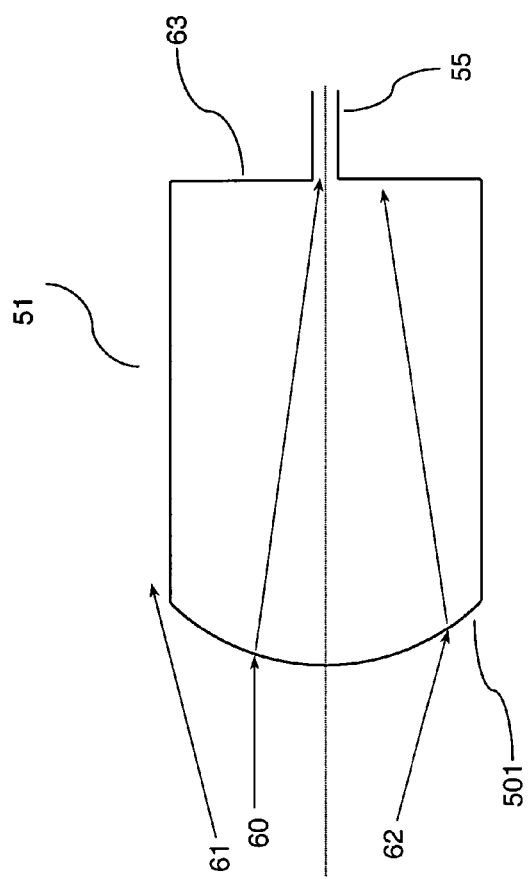
FIG. 6 shows the operation of a prior art spherical receive lens.

FIG. 6 shows a receive side lens 51 and selected incoming rays 60, 61 and 62 that have been emitted from the transmit lens (not shown) and have traversed the touch screen. The desirable situation is shown with ray 60, which strikes curved surface 501 and is refracted so as to enter waveguide 55 (ie. strikes the back surface 63 within 4 µm of the axis of symmetry). There are two possible situations where incoming rays do not enter waveguide 55, and these are potential sources of optical loss in the transmit/receive system. Firstly, ray 61 misses curved surface 501 and secondly, ray 62 is refracted at curved surface 501, but does not enter waveguide 55. Rays such as ray 61 that miss the receive lens are especially problematic because they may be collected by adjacent receive lenses.

The performance of the paired transmit/receive lens system was calculated by selecting rays at 0.2° increments in the divergence angle $\phi$ out to the maximum value of $\phi=14.4°$, and propagating them through the system to determine whether they are collected by the receive waveguide; the fraction of rays collected by the receive waveguide determines the efficiency of the system. Note that this method assumes the simplistic situation that the intensity distribution I($\phi$) of light launched into the transmit lens is uniform. The actual form of I($\phi$) depends on the number of optical modes in transmit waveguide 54, and is likely to be a complicated function since the waveguide is designed to be multi-mode. Generally, the more highly multi-moded the waveguide, the more uniform I($\phi$) will be. Irrespective of the actual form of I($\phi$), the calculations serve to illustrate the point that variations in temperature will affect the efficiency of the system. This calculation was performed firstly at 25° C., considered to be the standard operating temperature, and repeated at 50° C. and −10° C., the limits of a reasonable operating temperature range. The refractive index of polymer A at these temperatures is given in Table 1 below:

TABLE 1

| Temperature/° C. | Refractive index of polymer A |
| --- | --- |
| −10 | 1.5413 |
| 25 | 1.5315 |
| 50 | 1.5245 |

Figure 7A:
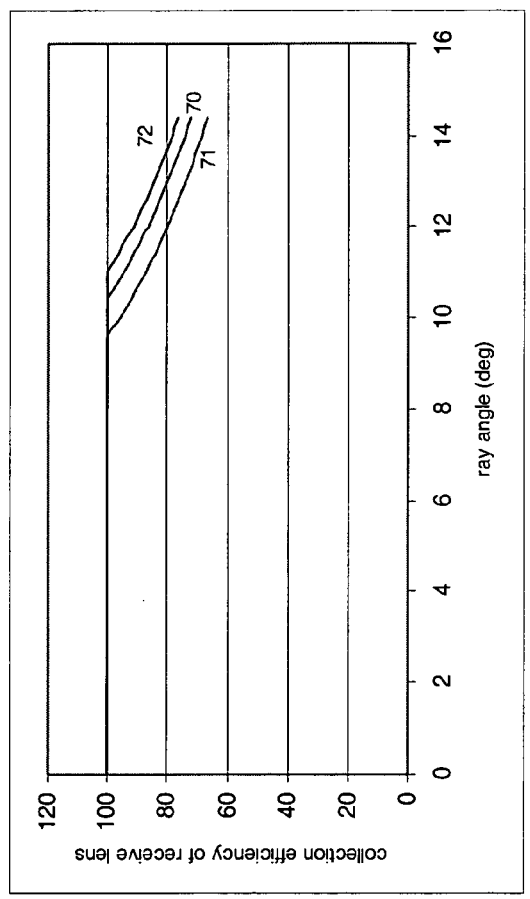
FIGS. 7a and 7b show the collection efficiency at the receive side of a prior art spherical transmit lens/receive lens pair at operating temperatures of 25° C., −10° C. and 50° C.
Figure 7B:
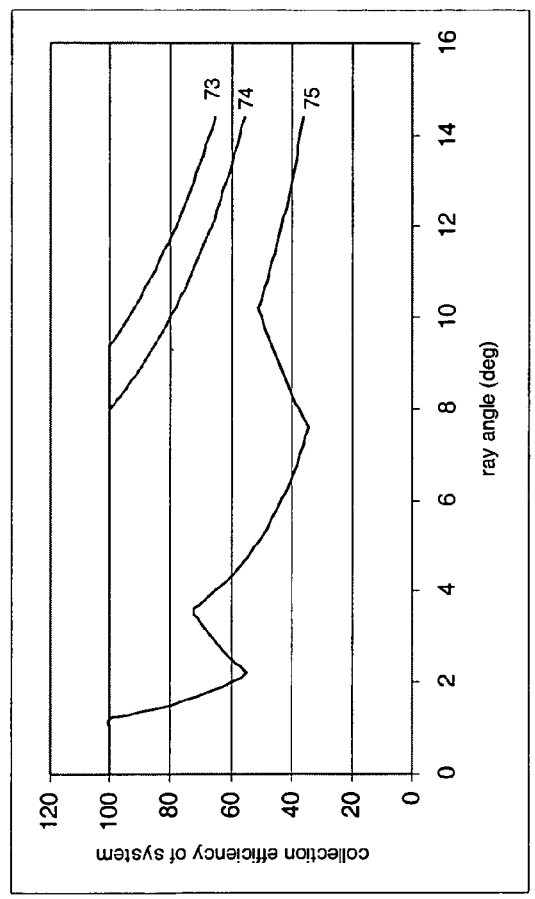

FIG. 7a shows the collection efficiency of the receive lens (ie. the percentage of rays emitted from transmit side lens 50 that strike curved surface 501) as a function of divergence angle $\phi$ at 25° C. (line 70), −10° C. (line 71) and 50° C. (line 72). Similarly, FIG. 7b shows the efficiency of the system as a whole (ie. the percentage of rays that strike curved surface 501 and enter receive waveguide 55) at 25° C. (line 73), −10° C. (line 74) and 50° C. (line 75). For each temperature, the maximum ray angle $\phi$ collected by the receive lens (ie. the angle beyond which lines 70, 71 and 72 drop below 100%) is given in Table 2 below. Light rays emerging from the transmit waveguide with $\phi$ greater than this value will be lost, and may be collected by adjacent receive waveguides. It can be seen that by this measure, the system performs best at 50° C., although the temperature effect is moderate.

TABLE 2

| Temperature/° C. | Maximum ray angle $\phi$ collected by receive lens |
| --- | --- |
| −10 | 9.6° |
| 25 | 10.4° |
| 50 | 11.0° |

Considering now the collection efficiency of the transmit/receive system as a whole (FIG. 7b), Table 3 gives, for each temperature, the maximum ray angle $\phi$ for 100% collection by the receive waveguide, and the system efficiencies for the cases where the transmit lens fill factor is ⅓($\phi$=4.8°), ⅔($\phi$=9.6°) and 1 ($\phi$=14.4°). It can be seen that temperature variations within the −10 to 50° C. operating range now have a much more significant effect. For a fill factor of ⅔, where all rays are collected by the receive lens (Table 2), the collection efficiency at the receive waveguide remains at virtually 100% at 25° C. However this falls to 83% at −10° C. and 48% at 50° C., indicating a significant loss of optical power.

TABLE 3

| Temp./° C. | Maximum ray angle $\phi$ for 100% collection by receive waveguide | System efficiency for transmit lens fill factor = 1/3 | System efficiency for transmit lens fill factor = 2/3 | System efficiency for transmit lens fill factor = 1 |
| --- | --- | --- | --- | --- |
| −10 | 8.0° | 100% | 83% | 56% |
| 25 | 9.4° | 100% | 98% | 65% |
| 50 | 1.2° | 54% | 48% | 36% |

Surprisingly, the system efficiency (Table 3) is worst at 50° C. even though the receive lens collection efficiency (Table 2) is best at this temperature. Clearly it cannot be assumed that all light entering the receive lens will be correctly refracted so as to enter the receive waveguide.

Figure 8:
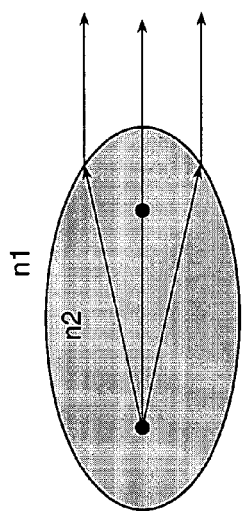
FIG. 8 illustrates the beam collimating property of an elliptical lens.

In Example 1, the curved surfaces of the lenses are arcs of a circle. It is a well known result of geometrical optics ("Optics", E. Hecht, $2^{nd}$ edn, Addison-Wesley (1987), pp. 130-131) that all rays emanating from a point source located in a medium of high refractive index $n_2$ (eg. polymer) can be refracted by an elliptical lens surface into a medium of low refractive index $n_1$ (eg. air) in a perfectly collimated manner, provided the point source is at the farther focus of the ellipse and the eccentricity e of the ellipse is equal to $n_1/n_2$. This situation, which obviously also holds in reverse (perfect focusing of a collimated beam), is illustrated in FIG. 8. From this result it is possible, at a given temperature, to achieve 100% collection efficiency in a transmit/receive lens system for any fill factor up to and including 1, if the lens surfaces are segments of an ellipse with appropriate eccentricity. With photolithographic processing, this would be straightforward once a suitable mask had been obtained. However any variation in temperature will change $n_2$, so that the lens surfaces will no longer provide perfect collimation and focusing, resulting once again in a decreased collection efficiency.

The root cause of the temperature sensitivity of transmit/receive lens systems for waveguide-based optical touch screen sensors is the temperature dependence of the refractive index of the polymer lens material, because when a light ray is refracted at an interface of two media, the (sines of) the angles of incidence and refraction are related to the ratio of the refractive indices of the media (Snell's Law). In contrast, when a light ray is reflected at an interface of two media, the angles of incidence and reflection are always equal irrespective of the refractive indices of the media. Therefore if a reflective means could be devised for collimating the light at the transmit side and collecting it at the receive side, the system would be essentially temperature independent. A particularly favourable situation arises if the angle of incidence at the polymer/air interface exceeds the critical angle, given by $\theta_c = \sin^{-1}(n_{air}/n_{polymer})$, in which case the reflection is 100% (a condition known as total internal reflection or TIR). With $n_{air}=1$, the critical angle for the interface between polymer A and air at −10, 25 and 50° C. is given in Table 4 below. The temperature dependence of $\theta_c$ over the −10 to 50° C. range is insignificant, and as will be shown it is straightforward to design a reflective transmit/receive system where the angle of incidence always exceeds $\theta_c$.

TABLE 4

| Temperature/° C. | $n_{polymer}$ | $\theta_c$ |
|---|---|---|
| −10 | 1.5413 | 40.45° |
| 25 | 1.5315 | 40.76° |
| 50 | 1.5245 | 40.99° |

Figure 9:
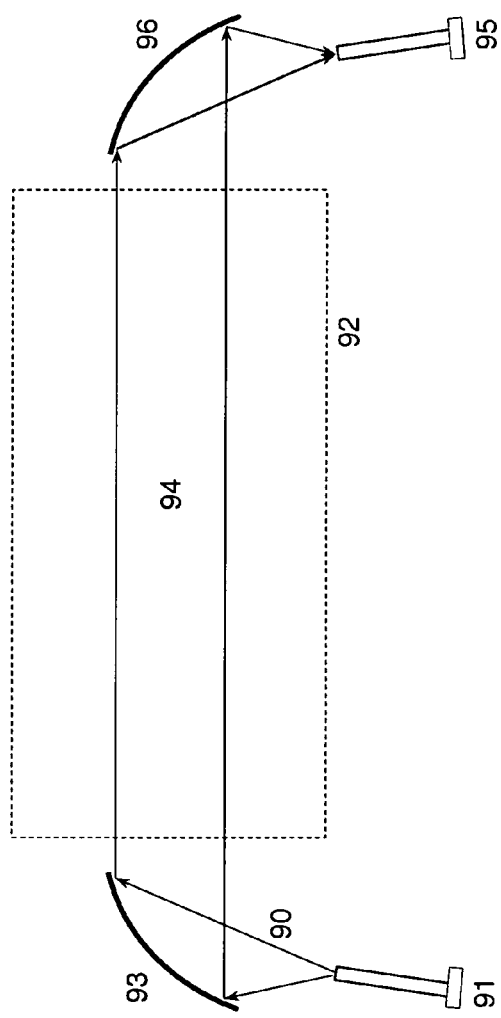
FIG. 9 illustrates a general method for incorporating reflective optics into the transmit and receive elements of a waveguide-based optical touch screen sensor.

FIG. 9 illustrates a general principle for incorporating reflective optics into the transmit and receive elements of an optical touch screen sensor. On the transmit side, light 90 emerging from transmit waveguide 91 is directed across display area 92 by reflector 93, as beam 94, then focused into receive waveguide 95 by reflector 96. In general, reflectors 93 and 96 can have any concave curved shape suitable for producing a collimated or convergent beam 94. Each may for example comprise a portion of a circle, ellipse, parabola or hyperbola, or any curve generated by a polynomial equation. Each may also comprise pluralities of straight segments that approximate a curved surface. In a preferred embodiment, reflectors 93 and 96 are parabolic in shape. In another preferred embodiment, reflectors 93 and 96 are elliptical in shape.

Figure 2:
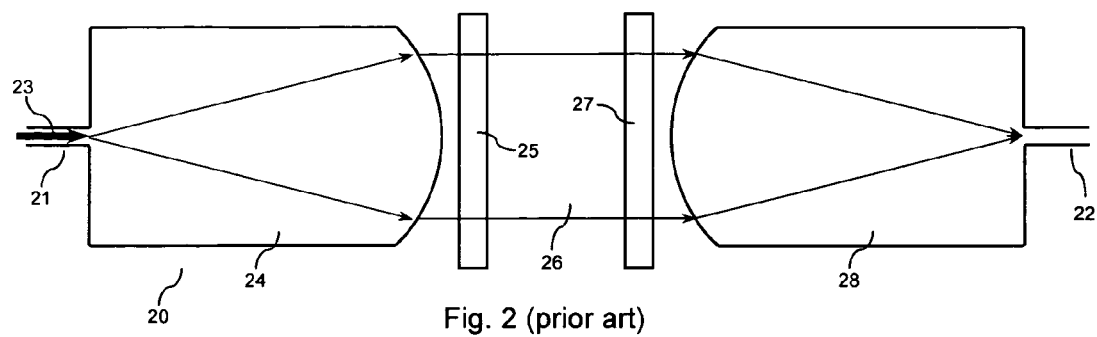
FIG. 2 illustrates the operation of a prior art transmission device for coupling light between two waveguides.

The invention will be described in terms of transmit and receive elements of an optical touch screen sensor with reduced temperature sensitivity. However it will be appreciated that the inventive principles apply more generally to any optical system comprising one or more waveguides with associated lenses, such as the transmission device shown in FIG. 2, that is impaired by a change in the refractive index of the lens (and hence its refractive power) caused by a change in temperature.

It is a well known result of geometrical optics ("Optics", E. Hecht, $2^{nd}$ ed., Addison-Wesley (1987), pp. 156-158) that a parabolic mirror provides perfect collimation of light emitted from a point source placed at the focus of the parabola. In principle then, transmit and receive optics involving TIR off parabolic polymer/air interfaces can provide essentially temperature-independent operation of an optical touch screen sensor. Those skilled in the art will understand that off-axis parabolic interfaces are preferred so that the source and receive waveguides do not obscure collimated beam 94, as shown in FIG. 9.

EXAMPLE 2

Figure 10:
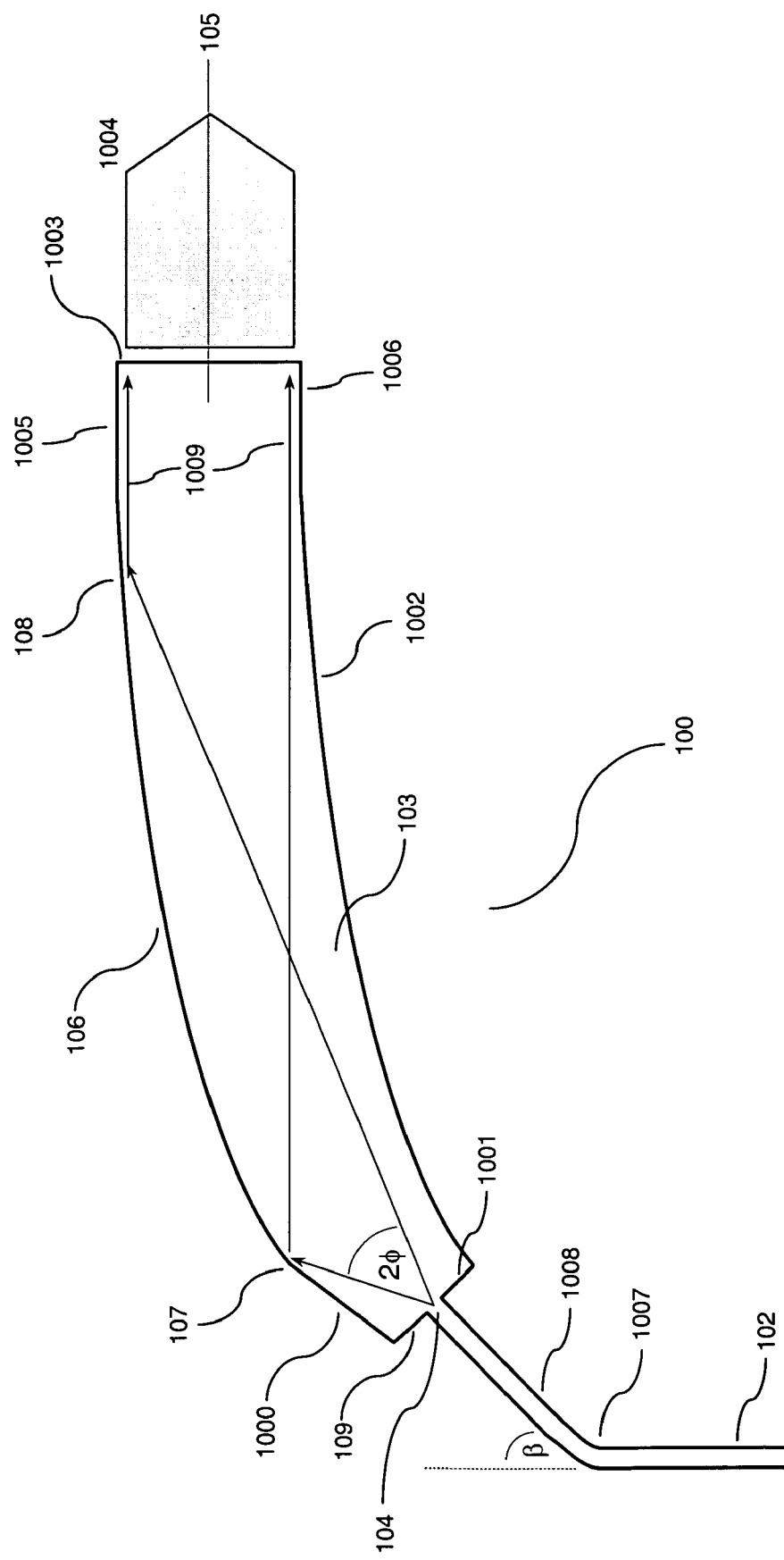
FIG. 10 is a plan view of a transmit element incorporating a parabolic reflective surface.

In accordance with the invention, a transmit element 100 incorporating a parabolic reflector is shown in FIG. 10. Transmit waveguide 102 guides light 101 through an angle β=33.1° at bend 1007, along straight section 1008 and into polymer slab region 103 at point 104, whereupon it spreads with divergence angle 2φ and encounters curved side 106 that is a portion of a parabola with focus at point 104 and with directrix perpendicular to optical axis 105. The angle of incidence $\theta_i$ ranges from 63° at point 107 to 68° at point 108, and is always greater than the critical angle (see Table 4) so that the total internal reflection condition is satisfied. After reflecting off curved side 106, the light is collimated along optical axis 105. Straight sides 109, 1000 and 1001 of polymer slab region 103 are 204 μm, 687 μm and 220 μm long, and curved sides 1002 and 106 are both 3493 μm long. After reflection off curved side 106, the light is collimated into parallel rays 1009 that exit transmit element 100 at end face 1003 to form transmitted beam 1004. End face 1003 is 709 μm wide, and the remaining straight sides 1005 and 1006 are both 110 μm long. A receive element is the mirror image of a transmit element and will not be described in detail.

Figure 11A:
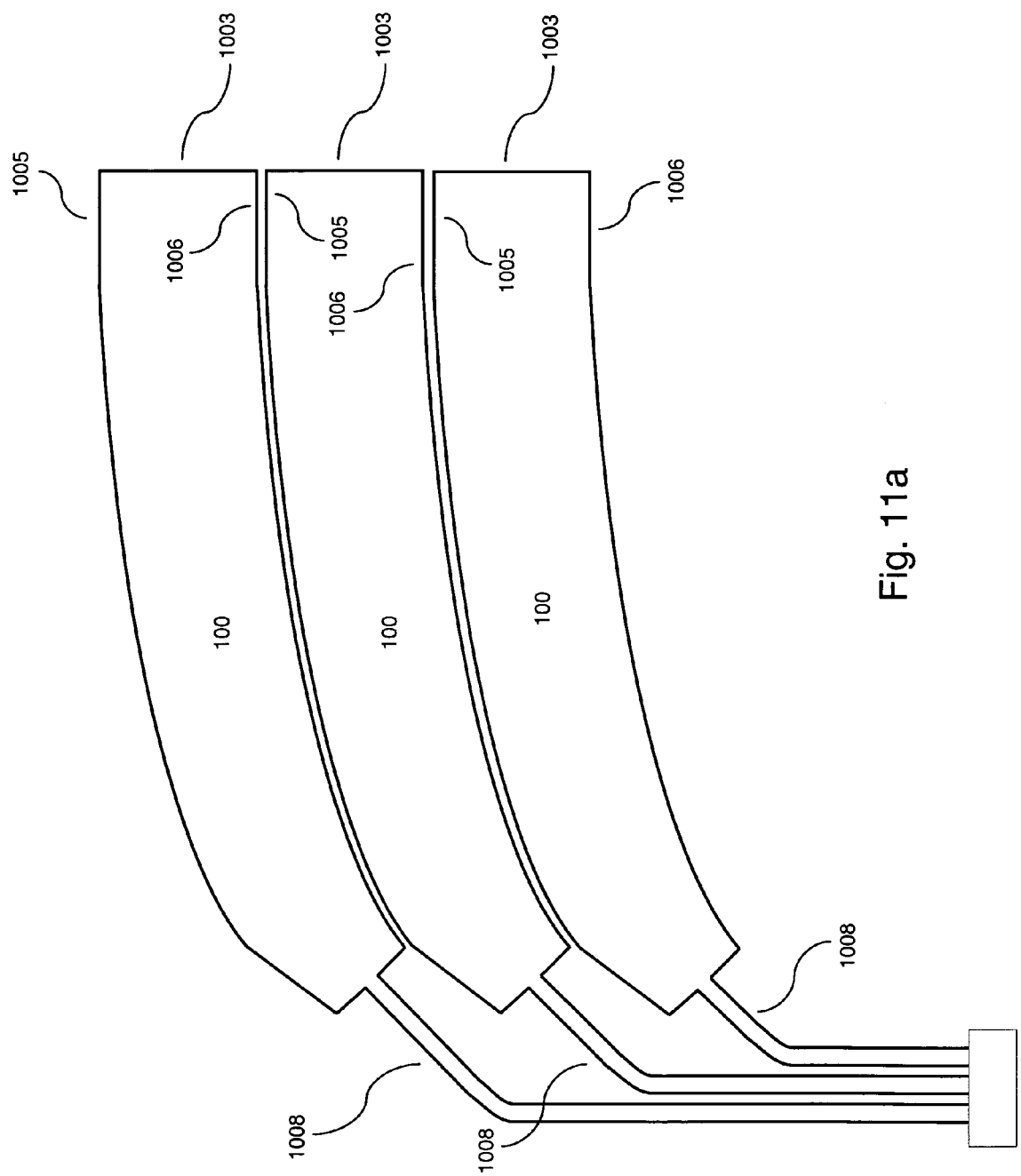
FIGS. 11a and 11b show two nesting configurations for reflector-based transmit elements of a waveguide-based optical touch screen sensor.
Figure 11B:
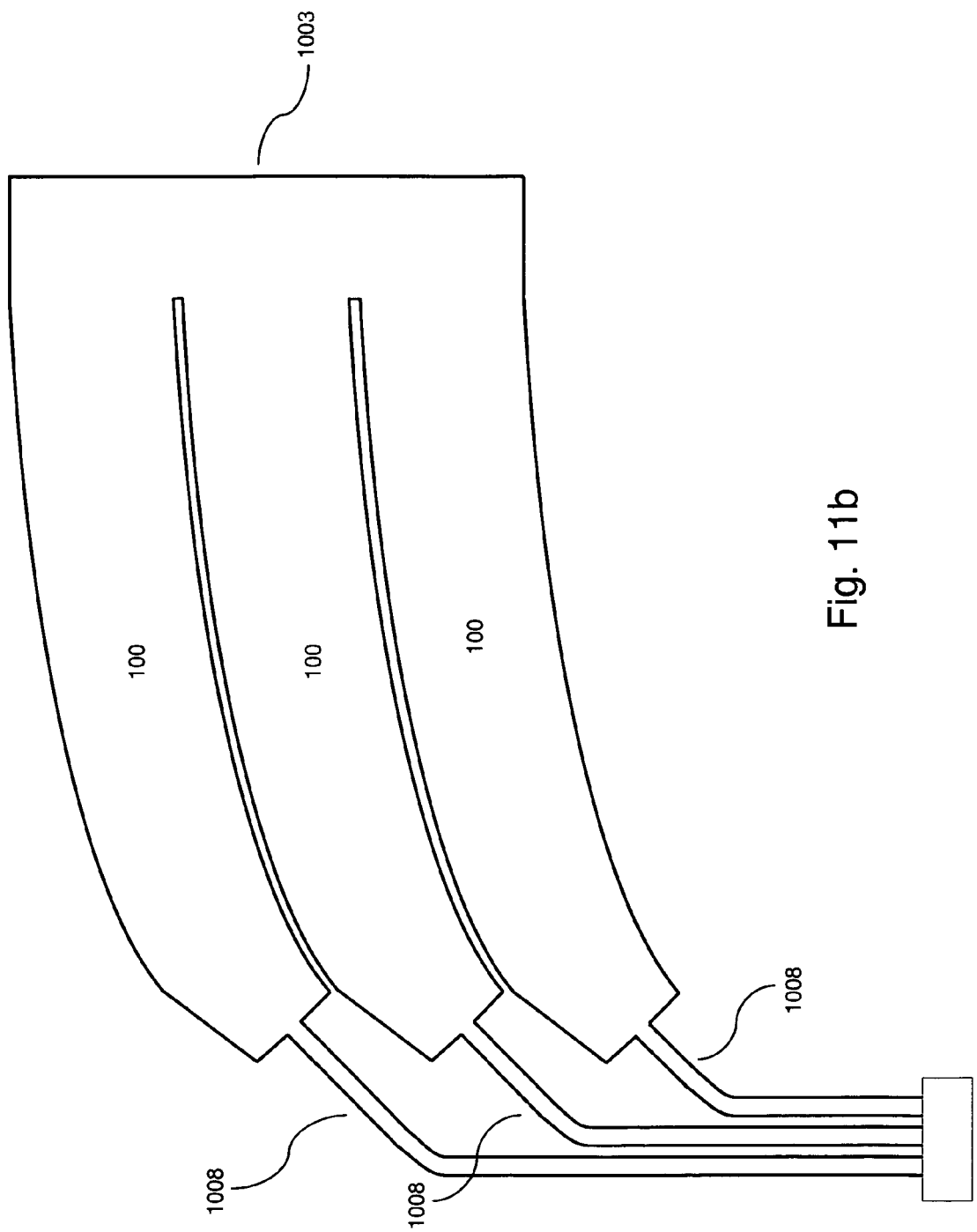

To form a transmit array, it is necessary to nest the transmit elements closely together. An example design for nested reflective transmit elements 100 is illustrated in FIG. 11a; as in FIGS. 1 and 5 the vertical collimating lenses have been omitted for clarity. It will be appreciated that this nesting design requires the length of straight sections 1008 to be incrementally varied. In an alternative nesting design, the length of straight sections 1008 can be held constant and the lengths of sides 1005 and 1006 incrementally varied. Note that sides 1005 and 1006 do not play any role in the operation of transmit element 100, and can be omitted as shown in FIG. 11b, such that all transmit elements 100 in the array share a common end face 1003. This configuration may be preferred over that shown in FIG. 11a, since there are no gaps between the individual element end faces through which foreign matter may enter and contaminate the reflective surfaces.

Figure 3B:
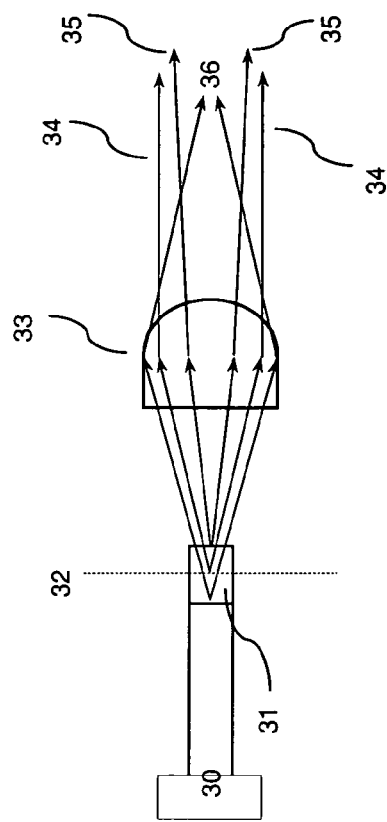
FIGS. 3a (plan view) and 3b (side view) show the positioning of a vertical collimating lens with respect to the end face of a prior art transmit lens.
Figure 3A:
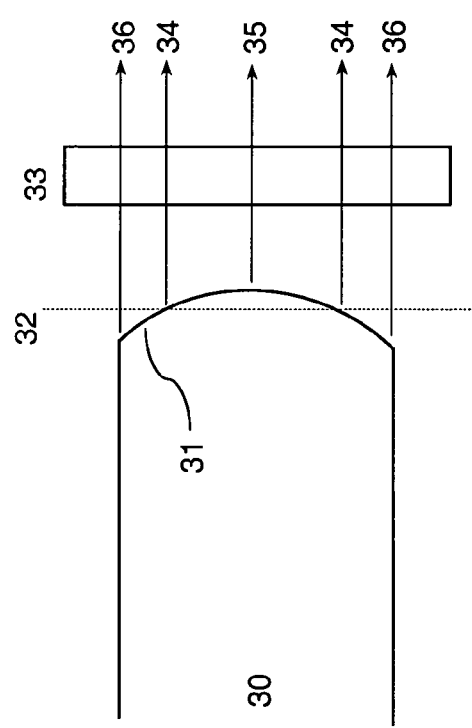
Figure 4B:
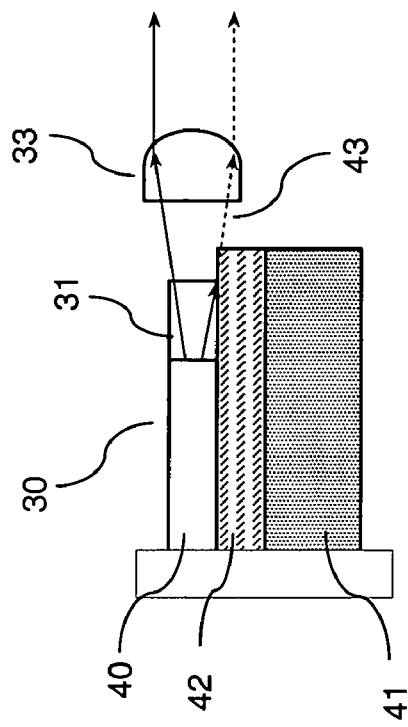
FIGS. 4a (plan view) and 4b (side view) illustrates the shadowing that occurs with a prior art transmit lens on a substrate, in proximity to a vertical collimating lens.
Figure 4A:
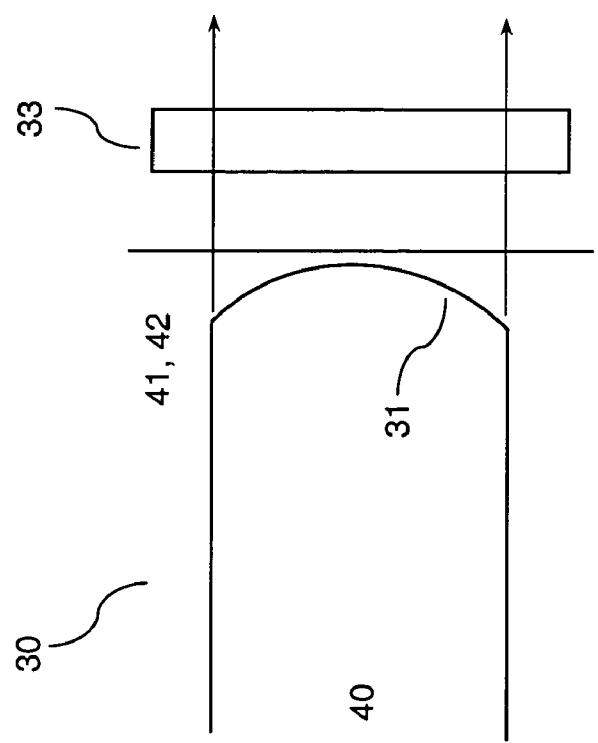
Figure 12A:
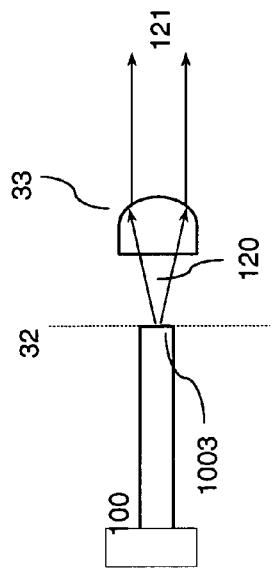
FIGS. 12a (plan view) and 12b (side view) show the positioning of a vertical collimating lens with respect to the end face of a parabolic reflector-based transmit element.
Figure 12B:
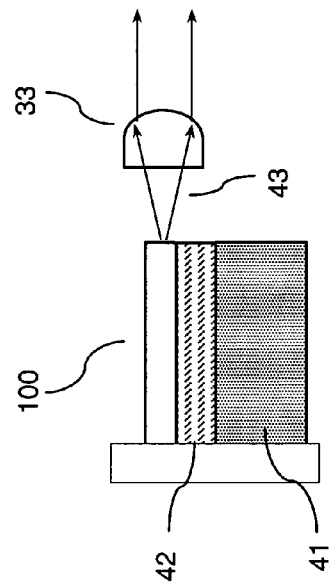
Figure 13A:
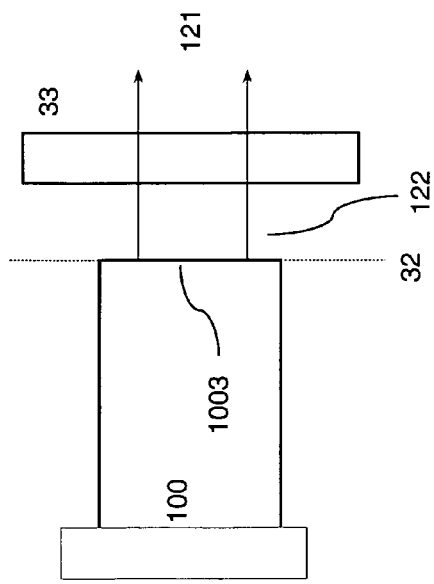
FIGS. 13a (plan view) and 13b (side view) show a parabolic reflector-based transmit element on a substrate, in proximity to a vertical collimating lens.
Figure 13B:
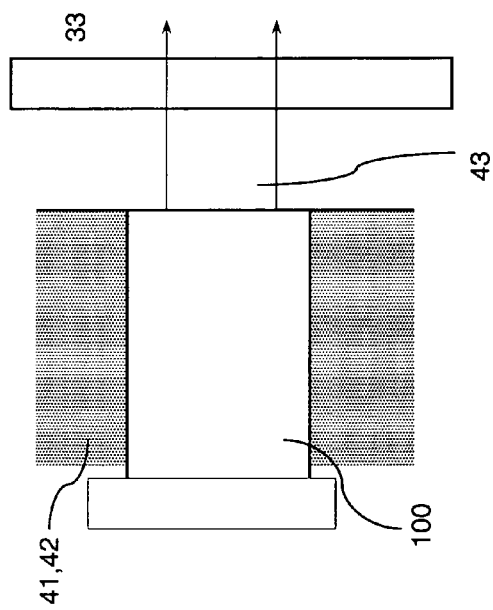

In FIG. 10, it is important to note that the parallel rays 1009 always encounter end face 1003 at normal incidence, where from Snell's Law the temperature-dependence of the polymer refractive index has no effect ($\theta_i=\theta_t=0$). Advantageously, this arrangement also yields a solution to the vertical collimation difficulties of the prior art transmit and receive lenses illustrated in FIGS. 3a, 3b, 4a and 4b. The positioning of vertical collimating lens (VCL) 33 with respect to end face 1003 of a single parabolic reflector-based transmit element 100 is illustrated in FIG. 12a (plan view) and FIG. 12b (side view). It will be appreciated that because end face 1003 is straight, it can be positioned at the focal plane 32 of VCL 33 so that the emerging beam 120, diverging in the vertical direction, can be focused equally well across its entire width to produce vertically collimated beam 121. This is in contrast to the situation with a lens shown in FIGS. 3a and 3b, where only a portion of curved end face 31 can be placed in the focal plane of VCL 33. Furthermore, because end face 1003 is straight, it can be readily cut with a dicing saw or a laser, thereby avoiding the shadowing effect shown in FIGS. 4a and 4b. FIGS. 13a (plan view) and 13*b* (side view) show that, for a parabolic reflector-based transmit element 100, there is no possibility of substrate 41 and buffer layer 42 blocking emerging rays 43 en route to VCL 33.

Referring to FIG. 12*a*, yet another advantage of the inventive approach is that during assembly, space 122 between end face 1103 and VCL 33 can be filled with adhesive to attach the VCL to the element array. This is not possible with the prior art lens approach because curved end face 31 relies on the polymer/air refractive index contrast. As will become clear below, it is preferable that the adhesive and the material used to form the transmit and receive elements are index matched, ie. their refractive indices are substantially equal.

Figure 14:
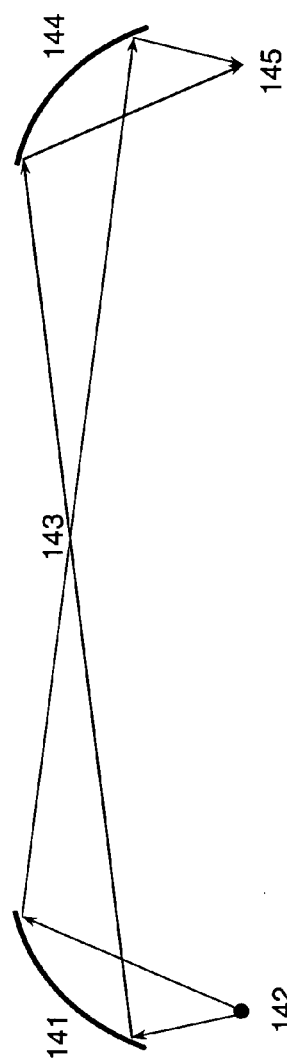
FIG. 14 illustrates the operation of a pair of transmit and receive elements with elliptical reflective surfaces.

With reference to FIG. 10, it will be appreciated that curved side 106 in Example 2 needs to be carefully designed and reproduced in the fabrication process if the light is to be perfectly collimated along optical axis 105. For example if curved side 106 is not perfectly parabolic in shape or if source point 104 is not at the focus, then the emerging beam will be slightly convergent or divergent. Alternatively, if the directrix of the parabolic reflective surface is not perpendicular to optical axis 105, then the emerging beam will be collimated in a direction that deviates slightly from the optical axis. In view of fabrication tolerances, an alternative embodiment where the transmitted beam is focused to a point between the transmit and receive elements may be desirable. If the transmit and receive elements of an optical touch screen sensor have identical size, the focal point should be located at the midpoint, as illustrated in FIG. 14. Those skilled in the art will understand that in this situation, transmit side reflector 141 needs to be a segment of an ellipse with foci at source point 142 and midpoint 143, and receive side reflector 144 needs to be a segment of an ellipse with foci at receive point 145 and midpoint 143. Compared to the embodiment with parabolic reflectors, a feature of an embodiment with elliptical reflectors is that the reflector design is dependent on the physical dimensions of the touch screen sensor, specifically the distance from the transmit and receive elements to midpoint 143.

EXAMPLE 3

Figure 15:
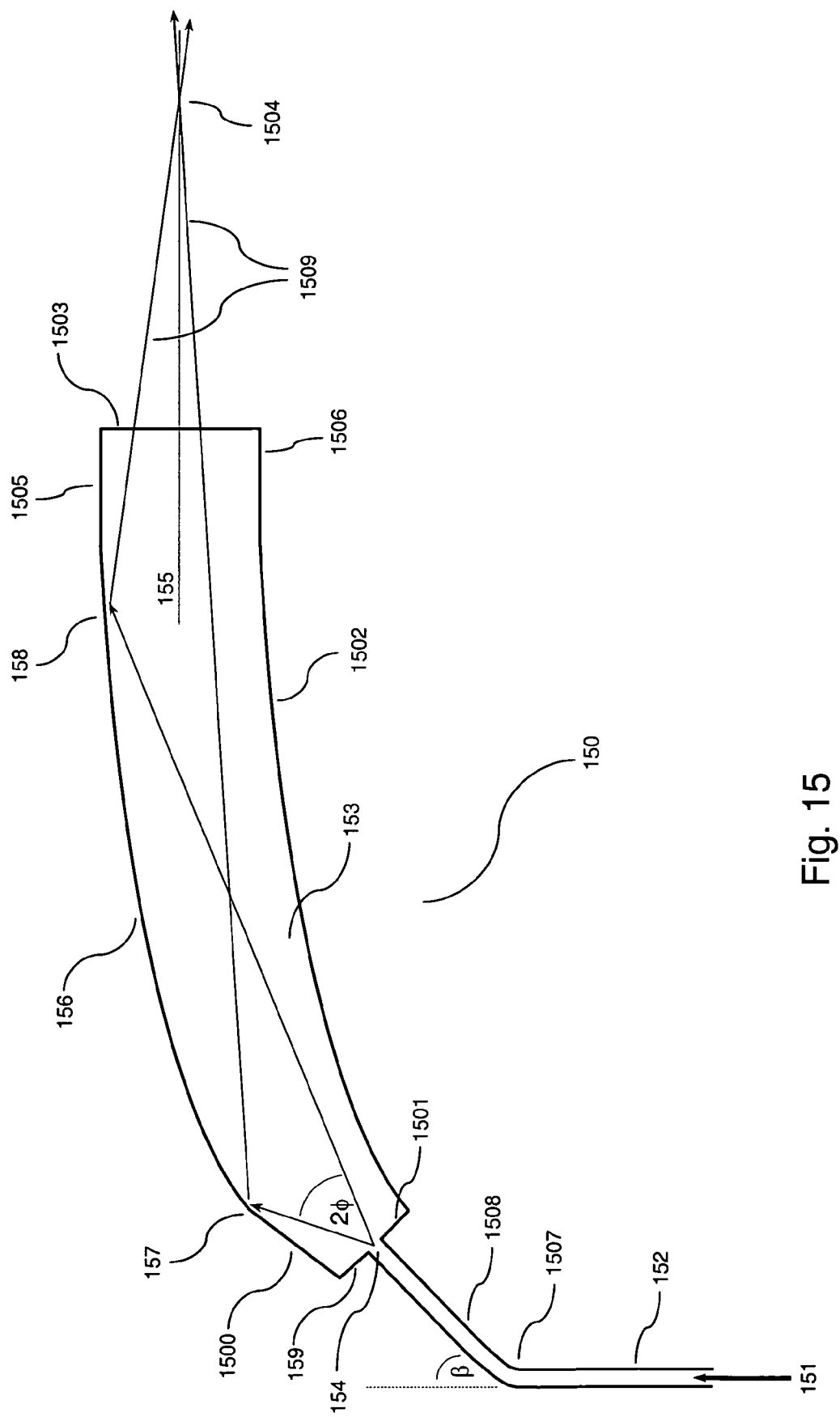
FIG. 15 is a plan view of a transmit element incorporating an elliptical reflective surface.

A transmit element 150 incorporating an elliptical reflector and designed for a 65 mm wide touch screen is shown in FIG. 15. Transmit waveguide 152 guides light 151 through an angle $\beta=33.1°$ at bend 1507, along straight section 1508 and into polymer slab region 153 at point 154, whereupon it spreads with divergence angle $2\phi$ and encounters curved side 156 that is a segment of an ellipse with one focus at point 154 and the other focus at point 1504 located a distance 32.5 mm from end face 1503. The angle of incidence $\theta_i$ ranges from 63° at point 157 to 68° at point 158, and is always greater than the critical angle (see Table 4) so that the total internal reflection condition is satisfied. Straight sides 159, 1500 and 1501 of polymer slab region 153 are 204 µm, 687 µm and 220 µm long, and curved sides 1502 and 156 are both 3493 µm long. After reflection off curved side 156, the light is focused into a beam 1509 that exits transmit element 150 at end face 1503 and converges to point 1504 on optical axis 155. End face 1503 is 709 µm wide, and the remaining straight sides 1505 and 1506 are both 110 µm long. A receive element is the mirror image of a transmit element and will not be described in detail. It will be appreciated that since transmit element 150 (with elliptical reflector) is virtually identical to transmit element 110 (with parabolic reflector) in overall shape, the nesting designs shown in FIGS. 11*a* and 11*b* are also applicable to transmit element 150, with the incremental increases in the length of straight section 1508.

In the interests of minimising temperature dependence, end face 1503 should comprise an arc of a circle centred on point 1504; so that all rays of beam 1509 encounter end face 1503 at normal incidence. Since the radius of curvature of end face 1503 will generally be much larger than its width (the dimensions of the touch screen are much larger than the individual transmit and receive elements), end face 1503 will deviate only slightly from straightness. Note however that if the space between the end face and the VCL is filled with an index matched adhesive during assembly, as mentioned above with regard to FIG. 12*a*, the shape of end face 1503 becomes irrelevant for the optical performance, and it can therefore be made advantageously straight. On the other hand, if space 122 is not filled with adhesive, it is still possible to design curved side 156 such that end face 1503 is advantageously straight while retaining the focusing of beam 1509 at point 1504. Although curved side 156 will then not be perfectly elliptical, it will still be a "quasi-elliptical" curved surface and within the scope of the invention.

Small adjustments to the reflector design may also be required once beam diffraction (ignored in the geometrical ray optics approach used in the previous examples) is taken into account. Those skilled in the art will recognise that diffraction will cause an additional and unavoidable spreading of the light beams as they traverse the display area. For the simple case of a Gaussian beam, the following two examples illustrate the effect of diffraction on a beam emitted by a transmit element incorporating a parabolic reflector, as it traverses a 65 mm wide touch screen.

EXAMPLE 4

In this example, the transmit element is designed to emit a 1 mm wide beam (ie. beam waist $w_0=0.5$ mm) at wavelength $\lambda=850$ nm. According to basic Gaussian optics, the Rayleigh range $z_R$, defined as the distance over which the beam radius increases by a factor of $\sqrt{2}$, is given by $z_R=\pi w_0^2/\lambda$. In this example, $z_R$ is 920 mm, which is much greater than the width of the touch screen (65 mm). Alternatively, after travelling a distance of 65 mm, the beam width will have expanded only slightly, from 1 mm to 1.034 mm. It can be seen that in this example, beam diffraction is negligible.

EXAMPLE 5

In this example, the transmit element is designed to emit a 0.25 mm wide beam (ie. beam waist $w_0=0.125$ mm) at wavelength $\lambda=850$ nm. It will be appreciated that narrower beams may be desirable for improved spatial resolution of the touch screen sensor. In this case, $z_R$ is only 58 mm, less than the width of the touch screen, and after 65 mm the beam width will have expanded from 0.25 mm to 0.364 mm (a 50% increase), so that beam diffraction is certainly not negligible.

To compensate for beam diffraction, it may be desirable to make slight adjustments in the reflector design. For example, the optimum shape for the reflector may deviate slightly from a perfect parabola or ellipse. However it will be understood that such quasi-parabolic and quasi-elliptical curved shapes are within the scope of the invention.

Irrespective of the particular shape of the reflective surface, the nested layouts shown in FIGS. 11*a* and 11*b* have an additional advantage over the prior art layout shown in FIG.

1, in terms of bend loss in the transmit side and receive side waveguides located in the screen bezel. As FIG. 1 shows, the prior art layout requires the transmit side waveguides 2 and receive side waveguides 3 to be bent through 90°, whereas the reflective optics layout requires them to be bent through a lesser angle; in the specific case of Examples 2 and 3 this angle is 33.1°. If all other factors (wavelength, waveguide dimensions and refractive index contrast) are equal, then the bend loss will be advantageously lower in the reflective optics layout, representing an additional saving in the optical power budget.

It should be noted that the reflective optics designs of Examples 2 and 3 are not absolutely temperature independent, since there remain two small effects of the temperature-dependence of the polymer refractive index. Both the divergence angle $2\phi$ inside polymer slab region 103 or 153 and the transmittance through end face 1003 or 1503 depend on the polymer refractive index. The first effect is small but difficult to quantify since, for a given width of transmit waveguide 102 or 152, the divergence angle depends on the number and type of optical modes launched into polymer slab region 103 or 153. This effect will change the beam width by a small amount (via the positions of points 107, 108, 157 and 158) but will not affect the collimation or focus of the beam.

The second effect can be readily quantified from the well known Fresnel equations ("Optics", E. Hecht, $2^{nd}$ edn, Addison-Wesley (1987), pp. 94-104). The equation for transmittance of light propagating from a medium of refractive index $n_i$ into a medium of refractive index $n_t$ is particularly simple at normal incidence, being given by $T=4n_i n_t/(n_i+n_t)^2$, irrespective of the polarisation state of the light. With $n_{air}=1$, the transmittance of light propagating from polymer A into air (and vice versa) at normal incidence and at −10, 25 and 50° C. is given in Table 5 below. This shows that less than 4.6% of light is lost in reflection at each of the transmit and receive polymer/air interfaces, and the temperature dependence, while present, is negligible over the chosen operating temperature range. Of course if the space between the end face and the VCL is filled with an index matched adhesive during assembly, as mentioned above with regard to FIG. 12a, there will be no reflection losses at the polymer/air interfaces.

TABLE 5

| Temperature/° C. | $n_{polymer}$ | T |
|---|---|---|
| −10 | 1.5413 | 0.9546 |
| 25 | 1.5315 | 0.9559 |
| 50 | 1.5245 | 0.9568 |

It will be readily understood that both of the above-mentioned temperature-dependent effects are also present in the prior art refractive optics approach shown in FIG. 5. Furthermore when considering transmittance through the polymer/air interfaces, the inventive reflective optics schemes shown in FIGS. 10 and 15 represent a simplification over the prior art refractive optics approach. Unlike in the inventive reflective optics scheme, where the angle of incidence at the end face is always zero (normal incidence), in the refractive optics approach the angle of incidence $\theta_i$ is variable, depending on the ray angle $\phi$, and this introduces a variability into the transmittance through the interfaces (according to the Fresnel equations). Note that away from normal incidence the Fresnel equations also have a dependence on the polarisation state of the light, but this can be neglected in the present case because the polarisation state is expected to be random. The net effect is that the transmittance decreases monotonically with increasing ray angle $\phi$, representing another source of optical loss. In the lens design of Example 1, where $\phi$ is limited to 14.4°, the transmittance at 25° C. is never more than 1% below the normal incidence value, so that this effect is negligible. However this may not be so for lens designs with larger possible ray angles $\phi$. The transmit side lens is particularly vulnerable, because (from geometry) $\theta_i$ increases more rapidly than $\phi$ (eg. in the design of Example 1, $\theta_i=26.7°$ when $\phi=14.4°$), and if $\theta_i$ approaches the critical angle (~40.5°), the transmittance through the polymer-to-air interface will rapidly approach zero. Finally, unlike the case with the inventive reflector-based transmit and receive elements, the reflection loss cannot be eliminated by filling the space between the end face and the VCL with an index matched adhesive.

EXAMPLE 6

This example describes the fabrication of an array of parabolic reflector-based transmit elements using a photo-patterning method. Following the synthetic procedure disclosed in U.S. Pat. No. 6,818,721, a lower refractive index polymer B was prepared with a viscosity of 2400 cP (at 20° C.) and a refractive index (measured at 20° C. on an Abbé refractometer with room light) of 1.498. A higher refractive index polymer A was prepared with a viscosity of 2300 cP (at 20° C.) and a refractive index of 1.524 (at 20° C.). A suitable photoinitiator was added to both polymer A and polymer B.

Polymer B was spin coated onto a silicon wafer and cured with UV light from a mercury lamp, to form a buffer layer 20 μm thick and with a refractive index of 1.5045 (at 25° C. and 850 nm). Polymer A was spin coated onto the buffer layer to form a core layer 11 μm thick, and patterned with UV light through a suitable mask. Unexposed polymer A material was then dissolved in isopropanol to leave exposed core material in the form of an array of parabolic reflector-based transmit elements, as shown for example in FIG. 11a or 11b. Exposed polymer A material had a refractive index of 1.5315 (at 25° C. and 850 nm). Finally, an upper cladding layer was deposited by spin coating a second layer of polymer B, patterning it with UV light through another suitable mask, and dissolving unexposed material with isopropanol.

Figure 16:
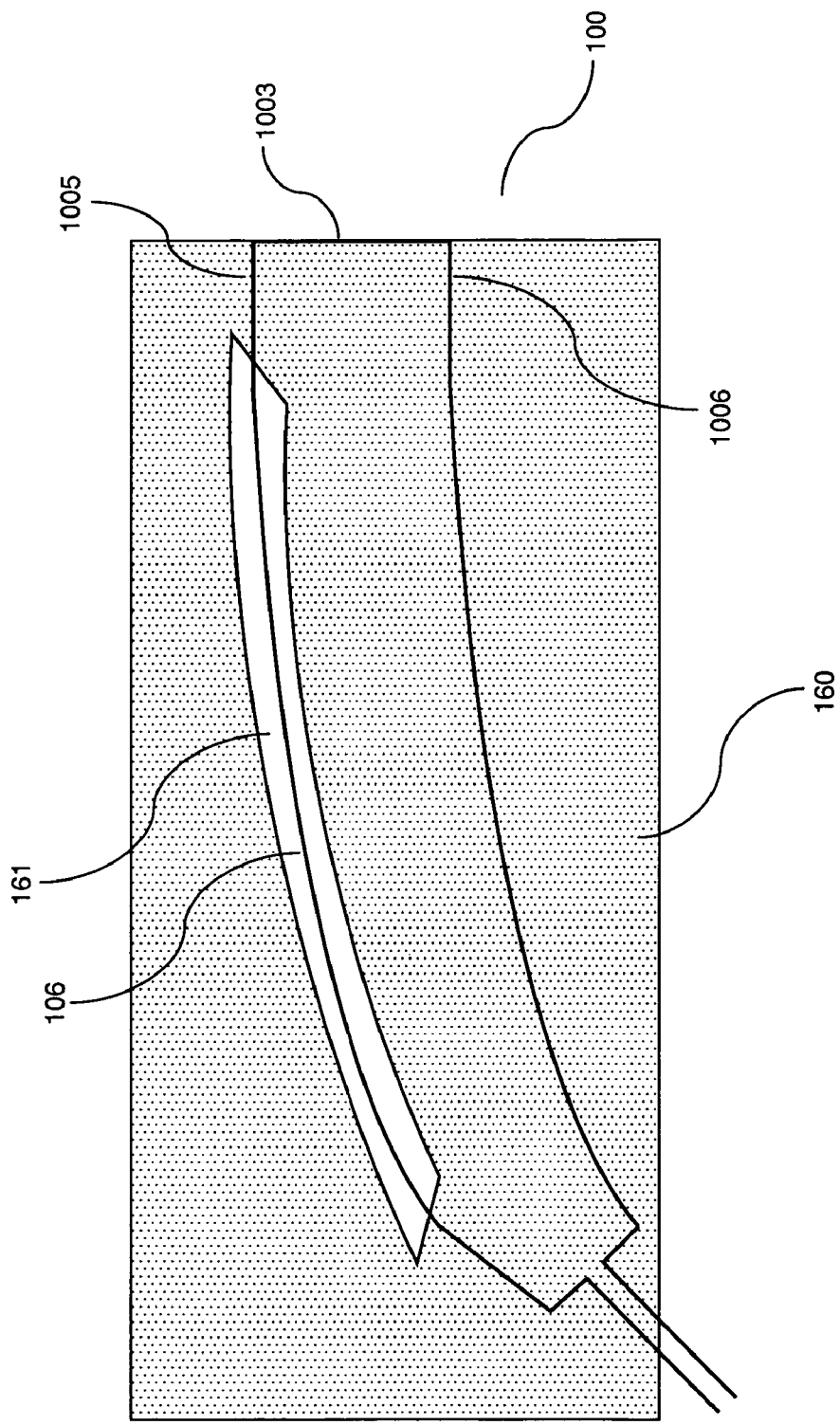
FIG. 16 shows a reflector-based transmit element with an appropriately patterned upper cladding.

Note that it is necessary to pattern the upper cladding layer (as disclosed in US patent application No. 2005/0089298 A1) so that the reflective curved side 106 of each transmit element retains the polymer/air interface required for total internal reflection. FIG. 16 illustrates one possible manner for an upper cladding 160 to be patterned, with a shaped hole 161 around reflective curved side 106. FIG. 16 also shows that upper cladding 160 can extend right up to end face 1003 of transmit element 100. This feature demonstrates yet another advantage of the inventive reflective optics approach, as it eliminates the abovementioned mechanical vulnerability problem of the prior art transmit and receive lenses. Reflective surface 106 beneath shaped hole 161 is much less likely to be damaged during handling and assembly than an exposed curved end face, and once assembly is complete it will be protected within the screen bezel. Another benefit of having an upper cladding 160 is that it will fill the gaps (if any) between sides 1005 and 1006, preventing ingress of foreign matter (such as uncured adhesive) that could contaminate reflective curved side 106.

EXAMPLE 7

This example describes the fabrication of an array of parabolic reflector-based transmit elements using a moulding method.

A layer of photoresist was spin coated onto a silicon wafer and exposed to UV light through the same mask used to pattern the polymer A layer in the previous example. Unexposed photoresist was then dissolved in isopropanol to produce a master with the desired waveguide pattern. Polydimethylsiloxane (PDMS) was cast onto the master, cured and peeled off to form a stamp.

High refractive index polymer A and low refractive index polymer B were prepared as in example 6. To fabricate the waveguide array, polymer B was spin coated onto a silicon wafer and cured with UV light to form a 20 µm thick buffer layer, then polymer A was spin coated onto the buffer layer to form an 11 µm thick core layer. The PDMS stamp was then applied to the polymer A layer, the polymer cured with UV light and the PDMS stamp peeled off. Optionally, an upper cladding layer can be deposited and patterned, either with UV light as in example 6 or by a second PDMS stamp.

PDMS is a preferred material for producing the stamp, because it has low surface energy (and therefore does not stick to most materials) and is transparent to the UV light used to cure the polymer A material.

Although the invention has been described with reference to specific examples it will be appreciated by those skilled in the art that the invention may be embodied in many other forms.

What we claim is:

1. An input device for an electronic device comprising:
   at least one light source;
   at least one multi-element light detector to detect light intensity at a plurality of light detecting elements;
   an input area defining a plane; and
   a waveguide structure including a first set of waveguides with associated first set of reflective elements, and a second set of waveguides, each composed of a material with first refractive index, wherein:
   said light source couples light into said first set of waveguides with associated first set of reflective elements;
   said first set of waveguides directs the light onto said associated first set of reflective elements;
   said associated first set of reflective elements collimates the light in the plane of the input area to produce a first grid of light beams; and
   said first grid of light beams traverses the input area in a first direction and is directed to the light detecting elements of said multi-element light detector by said second set of waveguides.

2. An input device according to claim 1, wherein said first set of waveguides with associated first set of reflective elements sends beams of light across the input area towards corresponding waveguides of said second set of waveguides.

3. An input device according to claim 1, wherein said second set of waveguides includes an associated second set of reflective elements to focus the beams of light in the plane of the input area.

4. An input device according to claim 1, wherein each element of the associated first set of reflective elements comprises a planar slab region having a curved reflective surface and an output face, wherein:
   light enters said planar slab region from the associated waveguide, reflects off said curved reflective surface, thereby being collimated and re-directed, and exits said output face in said first direction.

5. An input device according to claim 3, wherein each element of the associated second set of reflective elements comprises a planar slab region having an input face and a curved reflective surface, wherein:
   light enters said planar slab region through said input face in said first direction, encounters said curved reflective surface, and is thereby re-directed and focused into the associated waveguide.

6. An input device according to claim 4, wherein light reflects off said curved reflective surface via total internal reflection.

7. An input device according to claim 4, wherein said curved reflective surface is concave.

8. An input device according to claim 4, wherein said curved reflective surface is parabolic.

9. An input device according to claim 4, wherein said curved reflective surface is an off-axis parabolic mirror element.

10. An input device according to claim 4, wherein said curved reflective surface is elliptical.

11. An input device according to claim 5, wherein light reflects off said curved reflective surface via total internal reflection.

12. An input device according to claim 5, wherein said curved reflective surface is concave.

13. An input device according to claim 5, wherein said curved reflective surface is parabolic.

14. An input device according to claim 5, wherein said curved reflective surface is an off-axis parabolic mirror element.

15. An input device according to claim 5, wherein said curved reflective surface is elliptical.

16. An input device for an electronic device comprising:
    at least one light source;
    at least one multi-element light detector to detect light intensity at a plurality of light detecting elements;
    an input area defining a plane; and
    a waveguide structure including a first set of waveguides with associated first set of reflective elements, a third set of waveguides with associated third set of reflective elements, a second set of waveguides, and a fourth set of waveguides, each composed of a material with first refractive index, wherein:
    said light source couples light into said first and third sets of waveguides with associated first and third sets of reflective elements;
    said first and third sets of waveguides direct the light onto said associated first and third sets of reflective elements;
    said associated first and third sets of reflective elements collimate the light in the plane of the input area to produce first and second grids of light beams;
    said first grid of light beams traverses the input area in a first direction and is directed to a first set of light detecting elements of said multi-element light detector by said second set of waveguides; and
    said second grid of light beams traverses the input area in a second direction, different to said first direction, and is directed to a second set of light detecting elements of said multi-element light detector by said fourth set of waveguides.

17. An input device according to claim 16, wherein the first and third sets of waveguides and associated first and third sets of reflective elements send beams of light across the input area towards corresponding waveguides of the second and fourth sets of waveguides.

18. An input device according to claim 17, wherein the second and fourth sets of waveguides include associated second and fourth sets of reflective elements to focus the beams of light in the plane of the input area.

19. An input device according to claim 16, wherein:
each element of the associated first set of reflective elements comprises a planar slab region having a curved reflective surface and an output face, wherein light enters said planar slab region from the associated waveguide, reflects off said curved reflective surface, thereby being collimated and re-directed, and exits said output face in said first direction; and
each element of the associated third set of reflective elements comprises a planar slab region having a curved reflective surface and an output face, wherein light enters said planar slab region from the associated waveguide, reflects off said curved reflective surface, thereby being collimated and re-directed, and exits said output face in said second direction.

20. An input device according to claim 18, wherein:
each element of the associated second set of reflective elements comprises a planar slab region having an input face and a curved reflective surface, wherein light enters said planar slab region through said input face in said first direction, encounters said curved reflective surface, and is thereby re-directed and focused into the associated waveguide; and
each element of the associated fourth set of reflective elements comprises a planar slab region having an input face and a curved reflective surface, wherein light enters said planar slab region through said input face in said second direction, encounters said curved reflective surface, and is thereby re-directed and focused into the associated waveguide.

21. An input device according to claim 19, wherein light reflects off said curved reflective surfaces via total internal reflection.

22. An input device according to claim 19, wherein said curved reflective surfaces are concave.

23. An input device according to claim 19, wherein said curved reflective surfaces are parabolic.

24. An input device according to claim 19, wherein said curved reflective surfaces are off-axis parabolic mirror elements.

25. An input device according to claim 19, wherein said curved reflective surfaces are elliptical.

26. An input device according to claim 20, wherein light reflects off said curved reflective surfaces via total internal reflection.

27. An input device according to claim 20, wherein said curved reflective surfaces are concave.

28. An input device according to claim 20, wherein said curved reflective surfaces are parabolic.

29. An input device according to claim 20, wherein said curved reflective surfaces are off-axis parabolic mirror elements.

30. An input device according to claim 20, wherein said curved reflective surfaces are elliptical.

31. An input device according to claim 18, wherein said input area is quadrilateral, said first and third sets of waveguides with associated first and third sets of reflective elements are arranged along adjacent first and third edges of the input area, and said second and fourth sets of waveguides with associated second and fourth sets of associated reflective elements are arranged along adjacent second and fourth edges of the input area.

32. An input device according to claim 31, wherein said input area is rectangular, and the second direction is substantially perpendicular to the first direction.

33. An input device according to claim 31, wherein the first, second, third and fourth sets of waveguides with associated first, second, third and fourth sets of reflective elements terminate in end faces that are straight and parallel to the corresponding edges of the input area.

34. An input device according to claim 32, wherein the first direction is substantially perpendicular to the first and second edges of the input area, and the second direction is substantially perpendicular to the third and fourth edges of the input area.

35. An input device according to claim 1, wherein a user provides input to the electronic device by interacting with the input area.

36. An input device according to claim 35, wherein the user interacts with the input area with a finger or stylus.

37. An input device according to claim 1, wherein said waveguide structure is a photolithographically defined structure.

38. An input device according to claim 1, wherein said waveguide structure is a moulded structure.

39. An input device according to claim 1, wherein said material with first refractive index is a dielectric material.

40. An input device according to claim 39, wherein the dielectric material is a polymer.

41. An input device according to claim 16, wherein a user provides input to the electronic device by interacting with the input area.

42. An input device according to claim 41, wherein the user interacts with the input area with a finger or stylus.

43. An input device according to claim 16, wherein said waveguide structure is a photolithographically defined structure.

44. An input device according to claim 16, wherein said waveguide structure is a moulded structure.

45. An input device according to claim 16, wherein said material with first refractive index is a dielectric material.

46. An input device according to claim 45, wherein the dielectric material is a polymer.

47. An input device according to claim 1, wherein said associated first set of reflective elements collimates the light in a manner that is substantially independent of temperature.

48. An input device according to claim 3, wherein said associated second set of reflective elements focuses the beams of light in a manner that is substantially independent of temperature.

49. An input device according to claim 16, wherein said associated first and third sets of reflective elements collimate the light in a manner that is substantially independent of temperature.

50. An input device according to claim 18, wherein said associated second and fourth sets of reflective elements focus the beams of light in a manner that is substantially independent of temperature.

51. An input device according to claim 1, additionally comprising first and second external lenses proximate to the ends of the first and second sets of waveguides, to collimate the first grid of light beams in the direction perpendicular to the input area plane.

52. An input device according to claim 51, wherein the ends of the first and second sets of waveguides are straight and located in the focal planes of the first and second external lenses.

53. An input device according to claim 52, additionally comprising a transparent material with second refractive index between the ends of the first and second sets of waveguides and the first and second external lenses.

54. An input device according to claim 53, wherein said second refractive index is substantially equal to said first refractive index.

55. An input device according to claim 53, wherein said transparent material with second refractive index is an adhesive, to attach each external lens to its respective set of waveguides.

56. An input device according to claim 55, wherein said second refractive index is substantially equal to said first refractive index.

57. An input device according to claim 16, additionally comprising first, second, third and fourth external lenses proximate to the ends of the first, second, third and fourth sets of waveguides, to collimate the first and second grids of light beams in the direction perpendicular to the input area plane.

58. An input device according to claim 57, wherein the ends of the first, second, third and fourth sets of waveguides are straight and located in the focal planes of the first, second, third and fourth external lenses.

59. An input device according to claim 58, additionally comprising a transparent material with second refractive index between the ends of the first, second, third and fourth sets of waveguides and the first, second, third and fourth external lenses.

60. An input device according to claim 59, wherein said second refractive index is substantially equal to said first refractive index.

61. An input device according to claim 59, wherein said transparent material with second refractive index is an adhesive, to attach each external lens to its respective set of waveguides.

62. An input device according to claim 61, wherein said second refractive index is substantially equal to said first refractive index.

63. An optical transmission device comprising a first optical waveguide with an integrally formed reflective end structure and formed in a plane of a substrate, wherein said reflective end structure comprises a curved internally reflective surface to couple light between the first optical waveguide and an optical element.

64. An optical transmission device according to claim 63, wherein the curved internally reflective surface focuses light in the plane of the substrate.

65. An optical transmission device according to claim 63, wherein the curved internally reflective surface is parabolic.

66. An optical transmission device according to claim 63, wherein the curved internally reflective surface is an off-axis parabolic mirror element.

67. An optical transmission device according to claim 63, wherein the curved internally reflective surface is elliptical.

68. An optical transmission device according to claim 63, wherein said first optical waveguide and integrally formed reflective end structure comprise a dielectric material.

69. An optical transmission device according to claim 68, wherein the dielectric material is a polymer.

70. An optical transmission device according to claim 69, wherein said first optical waveguide and integrally formed reflective end structure are formed by photolithography.

71. An optical transmission device according to claim 69, wherein said first optical waveguide and integrally formed reflective end structure are formed by a moulding technique.

72. An optical transmission device according to claim 63, wherein said reflective end structure couples light between said first optical waveguide and said optical element in a manner that is substantially independent of temperature.

73. An optical transmission device according to claim 63, wherein the optical device comprises an optical source, and said reflective end structure couples light from said optical source into said first optical waveguide.

74. An optical transmission device according to claim 73, further comprising an external lens between said first optical waveguide and said optical source, to focus the light in the direction perpendicular to the substrate.

75. An optical transmission device according to claim 63, wherein the optical device comprises a detector, and said reflective end structure couples light from said first optical waveguide into said detector.

76. An optical transmission device according to claim 75, further comprising an external lens between said first optical waveguide and said detector, to focus the light in the direction perpendicular to the substrate.

77. An optical transmission device according to claim 63, wherein the optical element comprises a second optical waveguide with an integrally formed reflective end structure and formed on a second substrate, wherein said reflective end structure comprises a curved internally reflective surface.

78. An optical transmission device according to claim 77, further comprising a first external lens proximate to an end of said first optical waveguide, and a second external lens proximate to an end of said second optical waveguide, wherein the first and second external lenses focus light in the direction perpendicular to the substrate.

79. An optical transmission device according to claim 77, additionally comprising an input area between said first optical waveguide and said second optical waveguide.

80. An input device for an electronic device, comprising at least one optical transmission device according to claim 79.

81. An input device according to claim 80, wherein a user provides input to the electronic device by interacting with the input area.

82. An input device according to claim 81, wherein the user interacts with the input area with a finger or stylus.

* * * * *

UNITED STATES PATENT AND TRADEMARK OFFICE
CERTIFICATE OF CORRECTION

PATENT NO. : 7,352,940 B2  
APPLICATION NO. : 11/350387  
DATED : February 7, 2006  
INVENTOR(S) : Kukulj et al.

Page 1 of 1

It is certified that error appears in the above-identified patent and that said Letters Patent is hereby corrected as shown below:

\*\*Column 4, line 7, please replace "US Patent Application No. 2005/0089298 A1" with --US Patent No. 7,218,812--; and \*\*Column 5, line 24; please replace "directs" with --direct--

\*\*Column 8, line 44, please replace "illustrates" with --illustrate--

\*\*Column 16, line 6, please delete ";" after "1504"

\*\*Column 17, line 30, please replace "n, is" with --$n_t$is--

\*\*Column 18, lines 49 to 50, please replace "US Patent Application No. 2005/0089298 A1", with --US Patent No. 7,218,812--

\*\*Column 24, line 18, please replace "optical device" with --optical element--

\*\*Column 24, line 26, please replace "optical device" with --optical element--

\*\*In claim 73, line 2, please replace "optical device" with --optical element--

\*\*In claim 75, line 2, please replace "optical device" with --optical element--

Signed and Sealed this

Twelfth Day of August, 2008

JON W. DUDAS  
*Director of the United States Patent and Trademark Office*

UNITED STATES PATENT AND TRADEMARK OFFICE
CERTIFICATE OF CORRECTION

PATENT NO. : 7,352,940 B2  Page 1 of 1
APPLICATION NO. : 11/350387
DATED : February 7, 2006
INVENTOR(S) : Kukulj et al.

It is certified that error appears in the above-identified patent and that said Letters Patent is hereby corrected as shown below:

\*\*Column 4, line 7, please replace "US Patent Application No. 2005/0089298 A1" with --US Patent No. 7,218,812--; and \*\*Column 5, line 24; please replace "directs" with --direct--

\*\*Column 8, line 44, please replace "illustrates" with --illustrate--

\*\*Column 16, line 6, please delete ";" after "1504"

\*\*Column 17, line 30, please replace "$n_t$ is" with --$n_t$is--

\*\*Column 18, lines 49 to 50, please replace "US Patent Application No. 2005/0089298 A1", with --US Patent No. 7,218,812--

\*\*Column 24, line 18, please replace "optical device" with --optical element--

\*\*Column 24, line 26, please replace "optical device" with --optical element--

\*\*Column 24, In claim 73, line 18, please replace "optical device" with --optical element--

\*\*Column 24, In claim 75, line 26, please replace "optical device" with --optical element--

This certificate supersedes the Certificate of Correction issued August 12, 2008.

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,352,940 B2
APPLICATION NO. : 11/350387
DATED : April 1, 2008
INVENTOR(S) : Kukulj et al.

It is certified that error appears in the above-identified patent and that said Letters Patent is hereby corrected as shown below:

\*\*Column 4, line 7, please replace "US Patent Application No. 2005/0089298 A1" with --US Patent No. 7,218,812--; and \*\*Column 5, line 24; please replace "directs" with --direct--

\*\*Column 8, line 44, please replace "illustrates" with --illustrate--

\*\*Column 16, line 6, please delete ";" after "1504"

\*\*Column 17, line 30, please replace "n, is" with --$n_t$is--

\*\*Column 18, lines 49 to 50, please replace "US Patent Application No. 2005/0089298 A1", with --US Patent No. 7,218,812--

\*\*Column 24, line 18, please replace "optical device" with --optical element--

\*\*Column 24, line 26, please replace "optical device" with --optical element--

\*\*Column 24, In claim 73, line 18, please replace "optical device" with --optical element--

\*\*Column 24, In claim 75, line 26, please replace "optical device" with --optical element--

This certificate supersedes the Certificates of Correction issued August 12, 2008 and September 16, 2008.

Signed and Sealed this

Seventh Day of October, 2008

JON W. DUDAS
*Director of the United States Patent and Trademark Office*